(12) United States Patent
Maximov et al.

(10) Patent No.: US 10,511,441 B2
(45) Date of Patent: *Dec. 17, 2019

(54) METHODS OF PROVIDING A HASH VALUE, AND OF DERIVING A TIME STAMP FOR A PIECE OF DATA, ELECTRONIC DEVICE, SERVER, NETWORK NODE AND COMPUTER PROGRAMS

(71) Applicant: Telefonaktiebolaget LM Ericsson (publ), Stockholm (SE)

(72) Inventors: Alexander Maximov, Lund (SE); Bernard Ben Smeets, Dalby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 71 days.

This patent is subject to a terminal disclaimer.

(21) Appl. No.: 15/312,661

(22) PCT Filed: Jan. 18, 2016

(86) PCT No.: PCT/EP2016/050858
§ 371 (c)(1),
(2) Date: Nov. 20, 2016

(87) PCT Pub. No.: WO2016/131576
PCT Pub. Date: Aug. 25, 2016

(65) Prior Publication Data
US 2017/0104598 A1 Apr. 13, 2017

Related U.S. Application Data

(60) Provisional application No. 62/118,808, filed on Feb. 20, 2015.

(51) Int. Cl.
*H04L 9/32* (2006.01)
*H04L 9/00* (2006.01)

(52) U.S. Cl.
CPC ............ *H04L 9/3218* (2013.01); *H04L 9/006* (2013.01); *H04L 9/3236* (2013.01);
(Continued)

(58) Field of Classification Search
CPC ..... H04L 9/3247; H04L 9/006; H04L 9/3236; H04L 9/3239; H04L 9/3297; H04L 9/3242; H04L 2209/38
(Continued)

(56) References Cited

U.S. PATENT DOCUMENTS 6,097,811 A 8/2000 Micali
6,397,329 B1 5/2002 Aiello et al.
(Continued)

FOREIGN PATENT DOCUMENTS

EP 1912376 A1 4/2008
JP 2007028015 A * 2/2007
(Continued)

OTHER PUBLICATIONS

Ahto Buldas et al, "Keyless Signatures' Infrastructure: How to Build Global Distributed Hash-Trees", 2013, Springer, Berlin, Heidelberg, pp. 1-4 (Year: 2013).*
(Continued)

*Primary Examiner* — Ali S Abyaneh
(74) *Attorney, Agent, or Firm* — Leffler Intellectual Property Law, PLLC

(57) ABSTRACT

A client provides a hash value that provides for a time-stamp for data upon verification, by deriving a one-time signing key, OTSK, of a OTSK hash chain by applying a time fraction hash tree splitting a time slot corresponding to an index into time fractions such that the time slot is divided into fractions according to the number of leafs of the time fraction hash tree, forming a signing request by applying the OTSK for the fraction for the data to calculate hash values, and transmitting the signing request comprising the hash values to a server of a signing authority. The server receives the signing request from the client, derives a time stamp for the data including a hash path of the time fraction hash tree as a sub-tree of hash tree of the OTSK, and transmits the time stamp for the data.

29 Claims, 9 Drawing Sheets

(52) U.S. Cl.
CPC .......... *H04L 9/3239* (2013.01); *H04L 9/3242* (2013.01); *H04L 9/3247* (2013.01); *H04L 9/3263* (2013.01); *H04L 9/3297* (2013.01); *H04L 2209/38* (2013.01); *H04L 2209/76* (2013.01); *H04L 2209/80* (2013.01)

(58) Field of Classification Search
USPC ........................................................ 713/178
See application file for complete search history.

(56) References Cited

U.S. PATENT DOCUMENTS

| | | | | |
|---|---|---|---|---|
| 7,068,254 | B2* | 6/2006 | Yamazaki | G06K 9/0004 345/102 |
| 7,340,610 | B1* | 3/2008 | Yagawa | H04L 9/3236 711/133 |
| 8,086,842 | B2 | 12/2011 | Sidhu et al. | |
| 9,614,682 | B2* | 4/2017 | Buldas | H04L 9/3247 |
| 9,698,993 | B2 | 7/2017 | Zaverucha et al. | |
| 2002/0184504 | A1 | 12/2002 | Hughes | |
| 2002/0194484 | A1 | 12/2002 | Bolosky et al. | |
| 2003/0078058 | A1 | 4/2003 | Vatanen et al. | |
| 2004/0049675 | A1 | 3/2004 | Micali et al. | |
| 2007/0214363 | A1* | 9/2007 | Ishii | H04L 9/3297 713/178 |
| 2008/0095360 | A1 | 4/2008 | Vuillaume et al. | |
| 2008/0211624 | A1 | 9/2008 | Micali et al. | |
| 2009/0164783 | A1 | 6/2009 | Solis et al. | |
| 2009/0199010 | A1 | 8/2009 | Hakuta et al. | |
| 2009/0235349 | A1 | 9/2009 | Lai et al. | |
| 2010/0110935 | A1 | 5/2010 | Tamassia et al. | |
| 2010/0268943 | A1 | 10/2010 | Roy-Chowdhury et al. | |
| 2012/0046110 | A1 | 2/2012 | Amaitis et al. | |
| 2012/0239935 | A1 | 9/2012 | Osborne et al. | |
| 2012/0324229 | A1 | 12/2012 | Buldas et al. | |
| 2013/0163412 | A1 | 6/2013 | Hughes et al. | |
| 2014/0108817 | A1 | 4/2014 | Chen et al. | |
| 2014/0198791 | A1 | 7/2014 | Lim | |
| 2014/0245020 | A1 | 8/2014 | Buldas et al. | |
| 2015/0052615 | A1 | 2/2015 | Gault et al. | |
| 2015/0222619 | A1 | 8/2015 | Hughes et al. | |
| 2016/0028552 | A1 | 1/2016 | Spanos et al. | |
| 2018/0013567 | A1 | 1/2018 | Davis | |
| 2018/0205552 | A1 | 7/2018 | Struttmann et al. | |

FOREIGN PATENT DOCUMENTS

| | | | |
|---|---|---|---|
| JP | 2007028015 A | | 2/2007 |
| JP | 2011205234 A | * | 10/2011 |
| JP | 2011205234 A | | 10/2011 |
| TW | 201123802 A | | 7/2011 |
| WO | 0111828 A1 | | 3/2000 |
| WO | 2006124894 A2 | | 11/2006 |
| WO | 2014127904 A1 | | 8/2014 |
| WO | 2015155368 A1 | | 10/2015 |

OTHER PUBLICATIONS

"Message authentication code", https://web.archive.org/web/20120620150708/https://en.wikipedia.org/wiki/Message_authentication_code, Jun. 6, 2018, Wikipedia, pp. 1-2 (Year: 2012).*

Don Coppersmith et al., Almost Optimal Hash Sequence Traversal, pp. 1-16 , 2003.

Ahto Buldas et al., Efficient Implementation of Keyless Signatures with Hash Sequence Authentication, pp. 1-13 ,2014.

Ahto Buldas et al., Efficient Quantum-Immune Keyless Signatures with Identity, p. 1-14 , May 6, 2014.

Ahto Buldas et al., Keyless Signatures' Infrastructure: How to Build Global Distributed Hash-Trees, pp. 1-9 , Oct. 18, 2013.

Ahto Buldas et al., Knowledge-Binding Commitments with Applications in Time-Stamping (Full Version), pp. 1-17 ,2007.

Merkle Tree, from Wikipedia, the free encyclopedia, 3 pages, Mar. 30, 2012.

Ahto Buldas et al., Security Proofs for the BLT Signature Scheme, pp. 1-22, 2014.

Quan Son Nguyen, Multi-Dimensional Hash Chains and Application to Micropayment Schemes, arXiv:cs/0503060v1 [cs.CR]Mar. 23, 2005, pp. 1-9.

Erik Dahmen et al., Short Hash-Based Signatures for Wireless Sensor Networks, Cryptology and Network Security, Springer Berlin Heidelberg, Dec. 12, 2009, pp. 463-476.

Josh Benaloh et al., One-Way Accumulators: A Decentralized Alternative to Digital Signatures, Advances in Cryptology Eurocrypt 93, Springer Berlin Heidelberg, May 23, 1993, pp. 274-285.

Ahto Buldas et al., Optimally Efficient Accountable Time-Stamping, Public Key Cryptography; Lecture Notes in Computer Science; Springer-Verlag, Berlin/Heidelberg, Mar. 23, 2004, pp. 293-305.

Ahto Buldas et al., Keyless Signatures' Infrastructure: How to Build Global Distributed Hash-Trees, Correct System Design, Lecture Notes in Computer Science, Springer International Publishing, Cham, pp. 313-320.

PCT International Search Report dated Apr. 8, 2016 in connection with International Application No. PCT/EP2016/050297, all pages.

Written Opinion dated Apr. 8, 2016 in connection with International Application No. PCT/EP2016/050297, all pages.

PCT International Search Report dated Apr. 11, 2016 in connection with International Application No. PCT/EP2016/050860, all pages.

Written Opinion dated Apr. 11, 2016 in connection with International Application No. PCT/EP2016/050860, all pages.

Nobutaka Kawaguchi et al., Efficient log authentication for Forensic Computing, Proceedings of the 2005 IEEE, Workshop on Information Assurance and Security, United States Military Academy, West Point, NY, pp. 215-223.

Duc-Phong Le et al., Signtiming Scheme based on Aggregate Signatures, ISI 2008, Jun. 17-20, 2008, Taipei, Taiwan, pp. 145-149.

Wei Guo et al., Study on the Security of Time-Stamping Service Architecture, 2009 International Conference on Electronic Commerce and Business Intelligence, pp. 28-32.

PCT International Search Report dated Apr. 11, 2016 in connection with International Application No. PCT/EP2016/050861, all pages.

Written Opinion dated Apr. 11, 2016 in connection with International Application No. PCT/EP2016/050861, all pages.

Ahto Buldas et al., Security Proofs for Hash Tree Time-Stamping Using Hash Functions with small Output Size, ACISP 2013, LNCS 7959, pp. 235-250.

PCT International Search Report dated Apr. 13, 2016 in connection with International Application No. PCT/EP2016/050858, all pages.

Written Opinion dated Apr. 13, 2016 in connection with International Application No. PCT/EP2016/050858, all pages.

Non-Final Office Action dated Jun. 25, 2018 in connection with U.S. Appl. No. 15/312,651, 50 pages.

Ahto Buldas et al., Keyless Signatures' Infrstructure: How to Build Global Distributed Hash-Trees, 2013, Springer, Berlin, Heidelberg, pp. 1-9.

Non-Final Office Action dated Aug. 7, 2018 in connection with U.S. Appl. No. 15/312,624, 38 pages.

"Message authentication code", https://web.archive.org/web/20111224220942/http://en.wikipedia.org:80/wiki/ Message_Authentication_Code, Dec. 24, 2011, Wikipedia, 7 pages. (Year: 2011).

Notice of Allowance dated Apr. 16, 2019 in connection with co-pending U.S. Appl. No. 16/030,207, 17 pages.

PCT International Search Report, dated Apr. 8, 2016, in connection with International Application No. PCT/EP2016/050857, all pages.

PCT Written Opinion, dated Apr. 8, 2016, in connection with International Application No. PCT/EP2016/050857, all pages.

Yih-Chun Hu et al., Efficient Constructions for One-Way Hash Chains, In: Correct System Design, Jan. 1, 2005, Springer International Publishing, vol. 3531, pp. 423-441.

H. Krawczyk et al, Feb. 1997, HMAC: Keyed-Hashing for Message Authentication; Network Working Group; Request for Comments: 2104; Category: Informational; 10 pages.

Danny De Cock, Belgian eID Card Technicalities, Jun. 21, 2005, 34 pages.

(56) References Cited

OTHER PUBLICATIONS

PCT International Search Report, dated Dec. 16, 2015, in connection with International Application No. PCT/EP2015/057900, all pages.
PCT Written Opinion, dated Dec. 16, 2015, in connection with International Application No. PCT/EP2015/057900, all pages.
Markus Jakobsson et al., Fractal Merkle Tree Representation and Traversal, Grid and cooperative computing—GCC 2004, third international conference, Wuhan, China, Oct. 21-24, 2004, pp. 314-326.
Non-Final Office Action dated Mar. 24, 2017 in connection with U.S. Appl. No. 14/443,779, 23 pages.
Non-Final Office Action dated Sep. 7, 2018 in connection with U.S. Appl. No. 15/310,756, 67 pages.
Notice of Allowance dated Jan. 9, 2019 in connection with U.S. Appl. No. 15/310,756, 10 pages.
Non-Final Office Action dated Aug. 16, 2018 in connection with U.S. Appl. No. 16/030,207, 22 pages.

* cited by examiner

_US 10,511,441 B2_

METHODS OF PROVIDING A HASH VALUE, AND OF DERIVING A TIME STAMP FOR A PIECE OF DATA, ELECTRONIC DEVICE, SERVER, NETWORK NODE AND COMPUTER PROGRAMS

TECHNICAL FIELD

The present invention generally relates to a method of providing a hash value for a piece of data, where the hash value provides for a time-stamp for the piece of data upon verification. The invention also relates to a method of deriving a time stamp for a piece of data. The method further relates to a server of a signing authority for issuing a time stamp signature, to an electronic device arranged to derive a one-time signing key and providing a hash value for a piece of data, to a network node and to computer programs for implementing the methods.

BACKGROUND

"Big data", cloud, and the Internet of Things (IoT) are examples of the rapidly expanding area of distributed data networks and acquisition of distributed data. Data generated at a plurality of source nodes is collected for processing and/or analysis. An example of the source nodes includes sensor networks that perform measurements and provide measurement data, e.g., in home automation data networks or industrial processing data networks. A further example includes servers in a data center generating event log records, e.g. for operational security.

The operation of data networks, such as above examples, relies upon the integrity of the data received from the distributed data sources and the control processes. This means that as data is collected, it has to be possible to verify that the data has not been tampered with since the data left the source node. Furthermore, the data source has to be authentic. This means that an indicated source, e.g., a source node indicated by the received data or a data packet including the data, is the actual originator of the data.

Depending on operational security requirements, it is not sufficient that only the intended recipient collecting the data can verify aspects of integrity and authenticity. Rather, it is required that third parties can audit the data exchange between the source nodes and the collecting node. Conventional techniques for authenticating the data source implement public-key cryptography, e.g., using a Public Key Infrastructure (PKI) with signatures on all data exchanged between the nodes.

However, generating signatures is resource consuming in minimalistic source nodes (also referred to as "low-end devices") as sensors. Furthermore, the impact of signatures on bandwidth and/or storage is disproportionally large compared to the data to be exchanged (e.g., since the nodes have to be prepared for an audit, a large number of signatures have to be stored for relatively long time periods in the nodes). Moreover, signatures verifiable by a PKI are known to be cumbersome to establish and maintain over time, especially if many sources of data have to be distinguished, i.e., identified by means of different certificates.

Other conventional techniques, e.g. below referred to as QI-KSI, implement Merkle trees. Aggregating hash values of the exchanged data in a Merkle tree is efficient, since the "root" of the Merkle tree provides a compressed digest of all individual hash values, so that the Merkle tree reduces storage requirements. However considerable effort is needed to arrange for the keys in each leaf of the tree to be used for authentication.

Ahto Buldas, Andres Kroonmaa and Risto Laanoja have disclosed some principles in "Keyless Signatures' Infrastructure: How to Build Global Distributed Hash-Trees", below referred to as [1], in "Efficient Quantum-Immune Keyless Signatures with Identity", below referred to as [2], in "Efficient implementation of Keyless Signatures with Hash Sequence Authentication", below referred to as [3], and in "Security Proofs for the BLT Signature Scheme", below referred to as [4]. Ahto Buldas and Sven Laur have disclosed some principles in "Knowledge-Binding Commitments with Applications in Time-Stamping", below referred to as [5].

Every time the client wants to authenticate himself, a value $z_k$ needs to be recomputed from $z_n$, as will be further described in this disclosure. This may be a problem if n is large and there is no capacity to store or re-compute the whole hash chain. The solution to this problem is the technique called "hash sequence traversal". One such technique was proposed by D. Coppersmith and M. Jakobsson in their paper [6]. In order to derive $z_k$ faster than just sequential hashing from $z_n$ to $z_k$, the reversed order of hash chain $z_0 \leftarrow z_1 \leftarrow \ldots \rightarrow z_k \rightarrow \ldots$ can be derived in average log(n) time if one could keep log(n) of intermediate hash values of the hash sequence.

A short description of the M. Jakobsson and D. Coppersmith technique on the intuitive level can be given as follows. Assume the client can keep the value $z_{n/2}$, then the derivation of any value $z_k$ would require at most n/2 hashes, instead of n. Now let us assume that the client keeps two intermediate values $z_{n/2}$ and $z_{n1/4}$. Thus, the elements of the first half of the hash chain $z_k$, for k≤n/2, would require re-computation of at most n/4 hashes. When k becomes larger than n/2, the intermediate value $z_{n1/4}$ can be removed and a new value $z_{n3/4}$ is derived linearly in time n1/4 hash operations, so that the elements of the second half of the hash chain $z_k$, for k>n/2, can be calculated in at most n/4 hashes as well. It has been shown that having log(n) intermediate hash values, the total time to derive the reverse-order hash chain is log(n), in average.

It is important that a signing returned by a signing authority corresponds to a one-time signing key, OTSK, $z_i$ that has been used by the client. QI-KSI proposes the idea that the client actually needs to use 3 (or more) keys $z_i$, $z_{i+1}$ and $z_{i+2}$ and send a parallel request to TTP-SA for time-stamping. The signer will get 3 time stamps S's, but the stamp's time will correspond to only one of $z_i \ldots z_{i+2}$. This approach means that the signer can produce one signature per 3 time slots.

Consider that a KSI RH (root hash) is computed for each interval. Several intervals may be needed for a piece of data, as discussed above. However, in a use case when the client needs to sign a stream of data, this might be a performance bottleneck. It is therefore a desire to provide an efficient approach, particularly for streams of data.

SUMMARY

The invention is based on the understanding that application of a time fraction hash tree splitting time slots into fractions corresponding to the leafs of the time fraction hash tree enables a corresponding increased amount of pieces of data to be signed.

According to a first aspect, there is provided a method of a client for providing a hash value for a piece of data, where the hash value provides for a time-stamp for the piece of data upon verification. The method comprises collecting the piece of data and deriving a one-time signing key, OTSK, of a OTSK hash chain by applying a time fraction hash tree splitting a time slot corresponding to an index into time fractions such that the time slot is divided into fractions according to the number of leafs of the time fraction hash tree, forming a signing request for the piece of data by applying the OTSK for the fraction for the respective piece of data to calculate hash values of the piece of data, and transmitting the signing request comprising the hash values to a server for deriving a time stamp for the piece of data.

The time fraction hash tree may be splitting a time slot corresponding to an index into K time fractions such that the client creates K sets of OTSKs.

The method may comprise sending a signing request to a signing authority for a plurality of pieces of data, wherein each piece of data may be assigned a respective index consecutively by using OTSKs with time-forwarded OTSK indexes. The method may comprise, for the stream of pieces of data obtaining a time stamp for each piece of data, collecting the pieces of data and deriving OTSKs of a OTSK hash chain. The forming of signing requests may comprise forming a stream of signing requests for the pieces of data by applying the OTSKs with time-forwarded indexes and fractions for the respective piece of data to calculate hash values of the respective pieces of data. The signing of requests may comprise transmitting the stream of signing requests comprising the hash values to a server for deriving time stamps for the pieces of data, respectively.

The method may comprise deriving OTSKs of signer's OTSK hash chain by a one-way function of a secret key of the signer and a function of an index of the OTSK, and providing the hash value for the piece of data by a hash function including the piece of data and the derived OTSK. The function of the index may be the index itself. The one-way function may be a cryptographic message authentication code function. The one-way function may be a hash function.

The method may comprise registering the provided hash value.

The method may comprise providing a one-time proof of knowledge of the one-time signing key to a signing authority entity without revealing the one-time signing key. The one-time proof of knowledge may include a hash path for the hash value, and the providing of the one-time proof of knowledge to the signing authority may include sending the index of the one-time signing key, the hash value and the hash path.

According to a second aspect, there is provided a method of a server of a signing authority for issuing a time stamp signature. The method comprises receiving a signing request for a piece of data formed by application of a one-time signing key, OTSK, for a fraction corresponding to an index for time fractions defined by a time fraction hash tree splitting a time slot for the respective piece of data to calculate hash values of the piece of data where the time slot is divided into fractions according to the number of leafs of the time fraction hash tree, deriving a time stamp for the piece of data including a hash path of the time fraction hash tree as a sub-tree of hash tree of the OTSK, and transmitting the time stamp for the piece of data.

The signing requests for a plurality of pieces of data, respectively, may be received for one time slot, wherein the maximum number of signing requests for a time slot may be the number of fractions defined by the time fraction hash tree.

The signing request may be checked for client's signature before the deriving of a time stamp. The checking of the signing request may include determining whether the client has provided a one-time proof of knowledge about a one-time signing key to a server without revealing the one-time signing key. The determining may comprise checking whether the hash corresponds to a one-time signing key for a root hash included in a public certificate associated with the identity, checking whether an index corresponding to the hash path from the one-time signing key to the root hash corresponds to a correct time slot, and determining it to be proven that the electronic device is in possession of the correct one-time signing key when the checks are fulfilled. The checking of the signing request may comprise accessing a certificate matching the identity and a root hash for the first hash, checking validity of the certificate, and verifying whether the hash path for the first hash is correct, wherein if the certificate is not valid or the hash path cannot be verified to be correct, the server omits further actions for that signing request.

The receiving of a signing request may be a part of a sequence of signing requests with time-forwarded OTSKs indexes such that a delay time before the actual time-stamping procedure is provided so that there is enough time for receiving the signing requests, preparing them and synchronize the time with the signature infrastructure.

The server may be a server of a Trusted Third Party Signing Authority.

The signature infrastructure may be a Keyless Signature Infrastructure.

The method may further comprise transmitting a time stamp to the client, wherein a signer is enabled to reveal a signature of the piece of data including an identity, an index of the one-tune signing key, the OTSK and the time stamp for enabling verification of the time stamp for the piece of data.

The receiving of the signing request may comprise receiving a message from an electronic device, the message including a hash, an identity associated with the client and a hash path of the hash.

The method may include verification of a time stamp for a piece of data by determining whether a hash of the message is a leaf of the time stamp hash tree, determining whether the aggregate hash path corresponds to the correct identifier of the server to the server of the signature infrastructure entity, and determining whether the aggregate hash path and calendar hash path correspond to a correct calendar root hash for a time corresponding to the index.

The signing request may comprise a hash value of the piece of data, wherein the hash value is formed using a time-forwarded one-time signing key, OTSK, wherein the time-forwarded OTSK comprises a time-forwarded index, and the deriving of the time stamp may comprise queuing the signing request, pushing the hash value to a signature infrastructure entity at the time-forwarded time, and receiving the time stamp from the signature infrastructure entity.

According to a third aspect, there is provided an electronic device comprising a processor arranged to implement a functional module for deriving a one-time signing key and providing a hash value for a piece of data by a hash function including the piece of data and the derived one-time signing key, wherein the functional module is arranged to perform the method according to the first aspect.

The electronic device may be a wireless device.

According to a fourth aspect, there is provided a server comprising a processor arranged to implement a functional module for deriving a time stamp, wherein the functional module is arranged to perform the method according to the second aspect.

According to a fifth aspect, there is provided a network node comprising a server according to the fourth aspect.

According to a sixth aspect, there is provided a computer program comprising instructions which, when executed on a processor of an electronic device, causes the electronic device to perform the method according to the first aspect.

According to a seventh aspect, there is provided a computer program comprising instructions which, when executed on a processor of a server, causes the server to perform the method according to the second aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Certain embodiments disclosed herein relate generally to the technical field of security, and more particularly to the field of hash functions. For the easier understanding of the contribution by the invention, an introduction to mechanisms for providing hash functions used for time stamping is demonstrated below. For further facilitating the reading of this disclosure, commonly used abbreviations are listed below.

Abbreviations
Abbreviation Explanation
BLT Extension of KSI
CRH Calendar root hash
GW Gateway
KSI Keyless Signature Infrastructure
HMAC specific message authentication code algorithm construction
MAC message authentication code algorithm (generic)
PKI Public Key Infrastructure
TSA Time-Stamp Authority
PKI Public Key Infrastructure
Quantum-Immune KSI, e.g. BLT
RH Root hash of a Merkle type of tree
HP Hash path of a Merkle type of tree
LRS Left-Right Sequence of a hash path
AHP Aggregation hash path
ARH Aggregation root hash
CHP Calendar hash path
CRH Calendar root hash
TTP Trusted third party
TTP-SA Trusted third party signing authority
CA Certificate Authority
SK Secret key
PK Public key
HC Hash chain
OTSK One time signing key
OTAK One time authentication key Introduction to KSI KSI stands for the "Keyless Signature Infrastructure. This section is based on open sources, such as publications of papers [1-5] mainly on the cryptographic e-print web-based database where the authors describe different aspects of the KSI. The term "keyless signature" that is used in references [1-5] could be seen as slightly misleading. Another term, in the field of cryptography, that could be used instead is a "time stamp" of a given hash value, from the client's perspective. For consistent terminology with earlier work, we will nevertheless stick with the term KSI in the text below.

Merkle Trees and Hash Paths

Figure 1:
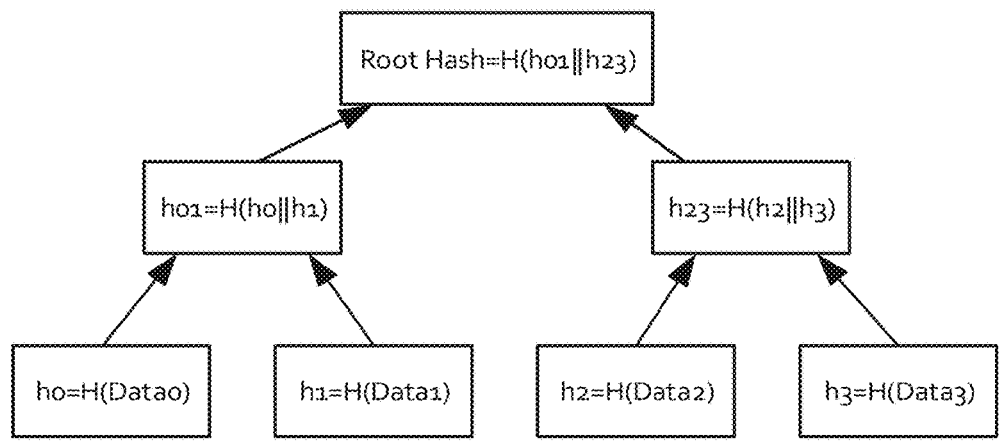
FIG. 1 illustrates a hash tree structure.

FIG. 1 illustrates a Merkle hash tree where H is a pre-defined hash function. The KSI is based on the well-known Merkle hash tree construction, a hash tree structure. The hash tree or Merkle tree is a tree in which every non-leaf node is labelled with the hash of the labels of its children nodes. Hash trees are useful because they allow efficient and secure verification of the contents of large data structures. Hash trees are a generalization of hash lists and hash chains. Demonstrating that a leaf node is a part of the given hash tree requires processing an amount of data proportional to the logarithm of the number of nodes of the tree; this contrasts with hash lists, where the amount is proportional to the number of nodes. FIG. 1 shows an example of such a tree with 4 leafs. The tree's leafs are digests of a pre-defined hash function H. The next layer includes two nodes with hash values $h_{01}$ and $h_{23}$ that are derived from the adjacent children leafs as the hash of the concatenation of the leafs' digests. The root hash (RH) is computed as the hash of the concatenation $h_{01}\|h_{23}$ (the order of the concatenation is important). This way, given the values on the tree's leafs one may compute the root hash that actually binds all the values of leafs together. I.e., changing any value in any leaf implies a change of the RH value.

Figure 2:
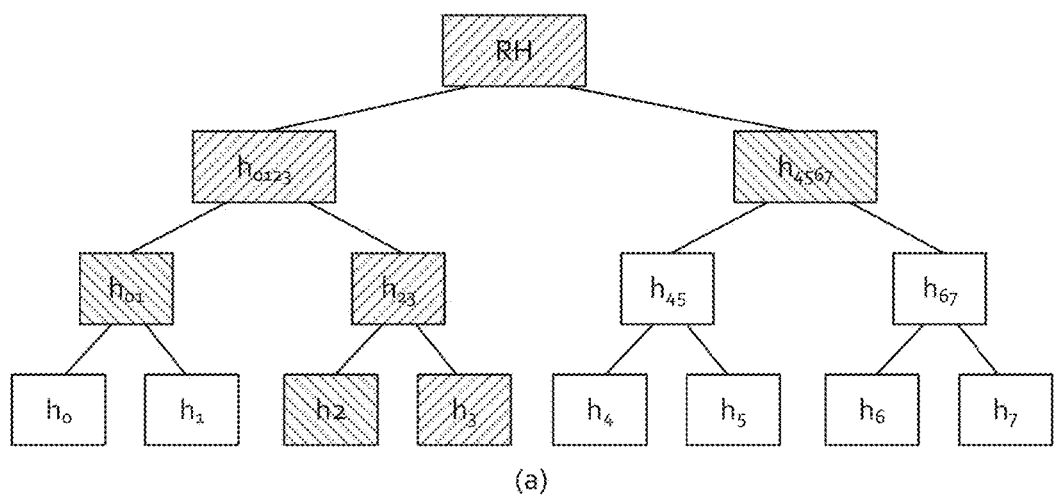
FIG. 2 illustrates a Merkle tree and a corresponding hash path.
Figure 2:
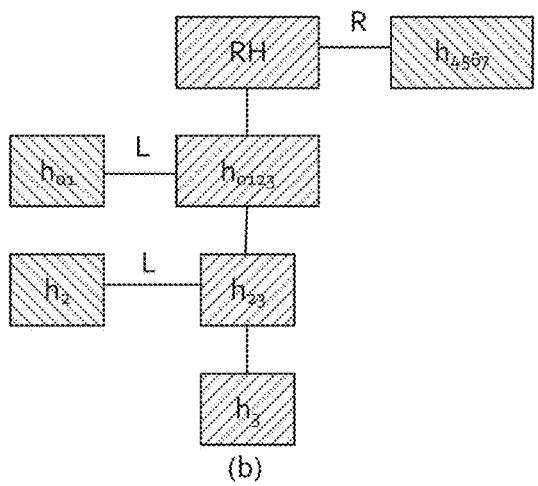

Another notion that we will use is the Hash Path (HP), which is an ordered sequence of hash values that helps to derive the root hash, starting from a chosen leaf value. FIG. 2 shows an example of a Merkle tree with 8 leafs, as illustrated in FIG. 2a, and the corresponding hash path for the leaf $h_3$, as illustrated in FIG. 2b, that includes the sequence of "missing" nodes of the tree needed for the complete derivation of the RH. Note that the "missing" hash values in each node are added to the child's hash value either from the left (L) or from the right (R) side. The ordered sequence of "L" and "R" marks of a given HP is a left-right sequence (LRS) of a given HP.

Thus, the path can be written as the sequence of 4 hash values $\{h_3;h_2(L);h_{01}(L);h_{4567}(R)\}$, and having the sequence of "L-R" marks one can compute the root hash explicitly.

It is also worth to note that an LRS is 1-to-1 mapped to the index of the leaf, if the LRS is translated into the binary representation with the following rules: L-R marks closer to the root represent the most significant bits of the index, and closer to the leafs represent the least significant bits of the index; L is translated to the bit value 1 and R is translated to the bit value 0.

Indeed, in the example illustrated in FIG. 2b of the hash path for $h_3$ the L-R sequence is "RLL", and it is translated to the correct index $011_2=3$.

As a final comment we note that we actually can change the hash function as we move through the tree. In that case an identifier of the hash function used in each merging node has to be encoded into the path.

KSI Architecture

Figure 3:
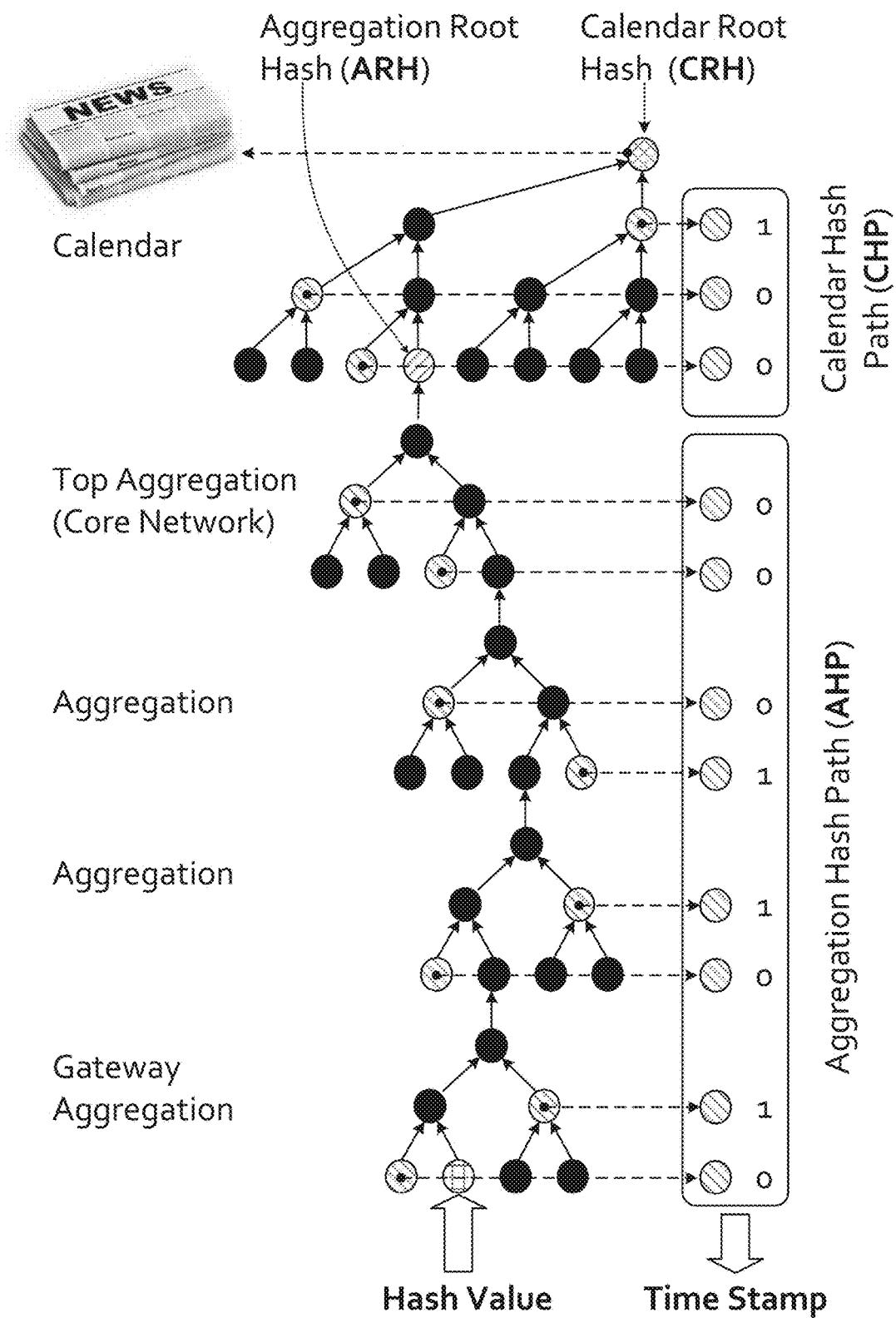
FIG. 3 schematically illustrates a KSI architecture.

A basic drawing of the KSI architecture is shown in FIG. 3. That is, FIG. 3 illustrates KSI's global Merkle tree and its layers. KSI makes it possible for many users to collectively insert their hash values into the distributed Merkle tree and to compute the collective root hash, at a given time slot.

The KSI system architecture includes several layers of aggregators, the functionality of each is basically to accept multiple hash values from the children connections, produce the local root hash, and push it to the upper layer for further aggregation. There are physically many aggregators on each layer that are distributed world-wide, but in the FIG. 3 there is only one hash path is shown, from the below single client to the top RH.

A client or a device may push its own hash value using the entry point called the Gateway. The Core Network (CN) is the last "station" of accumulating hash values into the large Merkle tree, and CN thus computes the aggregation root hash (ARH).

Additionally, CN has an extra modified Merkle tree to add the time stamping to ARH at a given time. The Calendar tree is organized such a way that it includes both the current ARH and the history of all previous ARHs in the past. The result of the Calendar tree is the Calendar Root Hash (CRH).

As the result of aggregation, the client receives back the aggregation hash path (AHP) from the client's hash value to the aggregation root hash, and also the calendar hash path (CHP) from the ARH to the global time stamp hash value that is actually the CRH.

The Core Network beats at regular intervals, for example, say once per second, which means that the CRH and the calendar tree are updated every second. CN also keeps the history of the global time-stamps for each second slot—the combination of ARHs and all historical CRHs in the past.

This way, the client or anyone else can later verify that the combination of a saved aggregation hash path and the calendar hash path at a certain time t lead to the correct value. I.e., LRS of AHP could be served as a static identifier of the Gateway (if the connection of the Gateway to the KSI infrastructure is static), and LRS of CHP is used to verify the time when the hash paths were created.

The global time stamp value CRH can be periodically published in a newspaper so that the Core Network cannot itself to modify the global time stamp back in time.

For verification purposes, the CRH can be received either off-line, or on-line. For off-line use cases one could take the CRH through the printed publications (that may be periodically once per month). For on-line verification use cases, the CRH can be signed by a trusted entity (perhaps, including a certificate), and then it can be downloaded by clients and/or applications at any time for verification purposes.

In the general architecture of KSI the entry point for clients (and/or applications) is the Gateway (GW) that itself can be an aggregation layer, but additionally provides the client's front-end for various services based on KSI's time-stamping infrastructure. This way, the Gateway can be seen as a server-based service engine that should be located close to the customer, or actually be on the customer's side.

The list of possible services that the Gateway may assist with includes: time-stamping of a given hash value, assistance in signing a document, etc. All those services are not really a part of KSI, but some of them are a part of QI-KSI.

Figure 4:
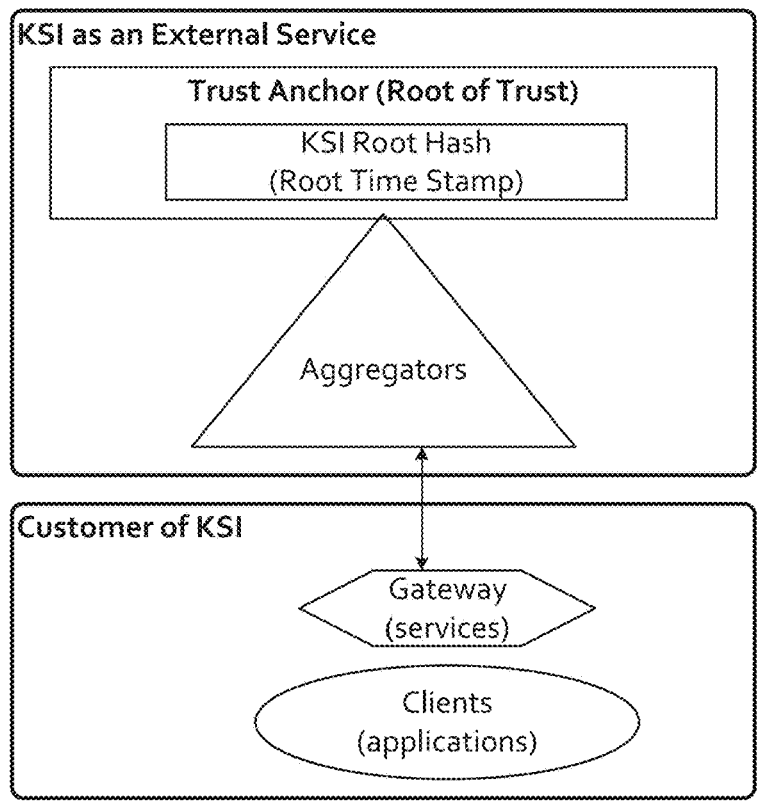
FIG. 4 illustrates a simplified view of the KSI architecture.

FIG. 4 illustrates a simplified view of KSI structure, and we may now refer to the simplified FIG. 4 of the KSI architecture.

Identifier Vs Identity

KSI returns the aggregation hash path and the calendar hash path. The AHP may be considered as the identifier of the Gateway, since the L-R sequence in the global Merkle tree determines the way the Gateway was connected to the KSI. However, this identifier may be valid if certain conditions are valid:

(a) The logical connection of the Gateway to KSI's leaf is static (b) A certificate that binds the Gateway's identity with the identifier is issued.

Later we will see how the identifier is used in the QI-KSI signing model.

Introduction to QI-KSI

QI-KSI stands for "Quantum-Immune KSI". This section is mainly based on the papers [2] and [4] identified in the introductory part of this disclosure.

QI-KSI is an extension for KSI and provides two hash-based techniques. Hash-based cryptography is, as of today, believed to be quantum immune, so this is the reason for the name "quantum-immune". QI-KSI proposes the technique for a hash-based authentication, and a hash-based digital signature architecture with the help of KSI's time-stamping service.

Hash Chains for Authentication

This is based on one-time passwords techniques. The client (and/or application) selects a random secret value $z_n$ (of size of the hash digest), and generates the hash chain (HC) $z_0 \leftarrow z_1 \leftarrow \ldots \leftarrow z_n$ as follows:

$$z_i = H(z_{i-1}), \text{ for } i=0, \ldots, n-1, \text{ and } H \text{ is a chosen hash function.}$$

The value $z_0$ is then shared with the server side (via some channel) to which the client is intended to authenticate himself.

At any given time, the server holds a value $z_k$ (in the beginning, the server holds the value $z_0$). When the client wants to authenticate himself, he uses and sends to the server the value $z_{k+1}$. The server verifies that $H(z_{k+1})=z_k$ and if the values coincide then the authentication is successful. In the latter case, the server throws away $z_k$ and holds $z_{k+1}$, instead, for future authentications.

This way, one secret key $z_n$ can be served for n authentications.

Hash Sequence Traversal Technique

In this scheme, every time the client wants to authenticate himself, the value $z_k$ needs to be recomputed from $z_n$. This may be a problem if n is large and there is no capacity to store or re-compute the whole hash chain. The solution to this problem is the technique called "hash sequence traversal". Such a technique was proposed in [6] by D. Coppersmith and M. Jakobsson. In order to derive $z_k$ faster than just sequential hashing from $z_n$ to $z_k$, the reversed order of hash chain $z_0 \leftarrow z_1 \leftarrow \ldots \leftarrow z_k \leftarrow \ldots$ can be derived in average $\log(n)$ time if one could keep $\log(n)$ of intermediate hash values of the hash sequence. A short description of the M. Jakobsson and D. Coppersmith technique on the intuitive level can be given as follows. Assume the client can keep the value $z_{n/2}$, then the derivation of any value $z_k$ would require at most $n/2$ hashes, instead of n. Now let us assume that the client keeps two intermediate values $z_{n/2}$ and $z_{n1/4}$. Thus, the elements of the first half of the hash chain $z_k$, for $k \le n/2$, would require re-computation of at most $n/4$ hashes. When k becomes larger than $n/2$, the intermediate value $z_{n1/4}$ can be removed and a new value $z_{n3/4}$ is derived linearly in time $n1/4$ hash operations, so that the elements of the second half of the hash chain $z_k$, for $k > n/2$, can be calculated in at most $n/4$ hashes as well. It has been shown that having $\log(n)$ intermediate hash values, the total time to derive the reverse-order hash chain is $\log(n)$, in average.

QI-KSI Signing Model

Figure 5:
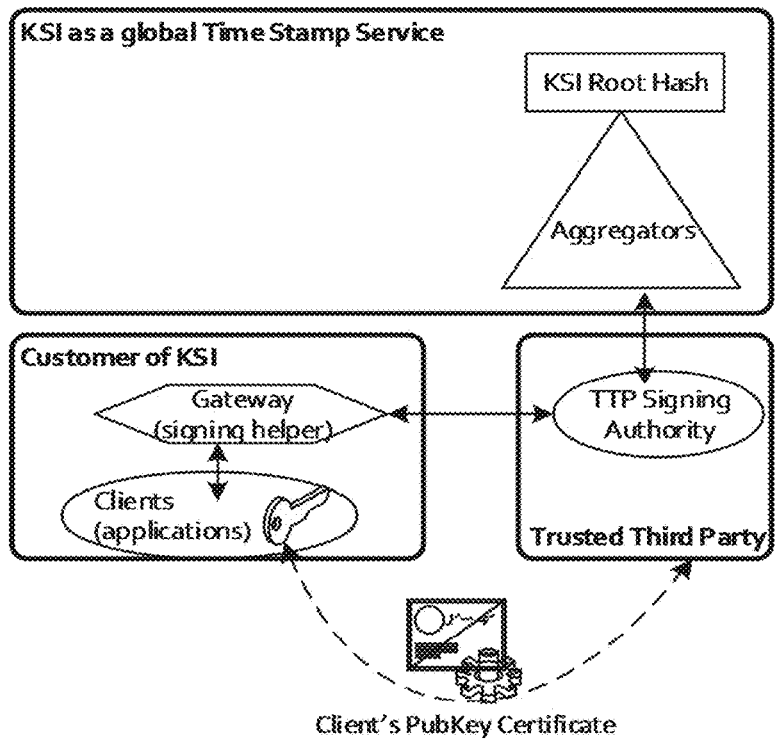
FIG. 5 illustrates a model of signing documents in QI-KSI.

The model of signing documents in QI-KSI is showed in FIG. 5. The client (or the Gateway, if the signing key is delegated), needs to create a secret signing key, and get a certificate from a CA on the public key. In this model, we look on the solution where a Trusted Third Party (TTP) behaves as a Signing Authority (TTP-SA) and takes part of the signing process and performs time-stamping of client's signing requests.

In QI-KSI, the signer first creates his own pair of the secret key and the public key. The signer chooses a random secret key $z_n$. Then, the sequence of values (hash chain) $z_0 \leftarrow \ldots \leftarrow z_n$ is computed as $z_i = H(z_{i+1})$ for $i=0, \ldots, n-1$, and $H$ is a chosen hash function.

The value $z_0$ is the public key and a relevant certificate for the public key $z_0$ is generated by an external certificate authority (CA). The value $z_0$ is bound with the user's identity in the validity time $t_0$ seconds from a well-known date (number of seconds from the date Jan. 1, 1970 and time 00:00:00) that determines the time after which the certificate is valid. To be more precise, a certificate should include at least the following fields: Cert:={Client's identity records; $z_0$, $t_0$, TTP-SA's identity and identifier}, where the TTP-SA's identifier can be the index of the leaf in the global KSI Merkle tree to which the TTP-SA is statically attached.

QI-KSI signing key looks similar to the hash chain in the QI-KSI authentication method, but the difference comes from the meaning of the index k in the notation $z_k$. The values $z_k$, $k=1, \ldots, n$, are used as one-time signing keys (OTSK) each of which can be used only at a certain KSI's time frame that is exactly $(t_0+k)$th second from the global starting time (recall, the Core Network "beats" and produces global time stamp values with the speed once per second).

QI-KSI Signing Protocol

Figure 6:
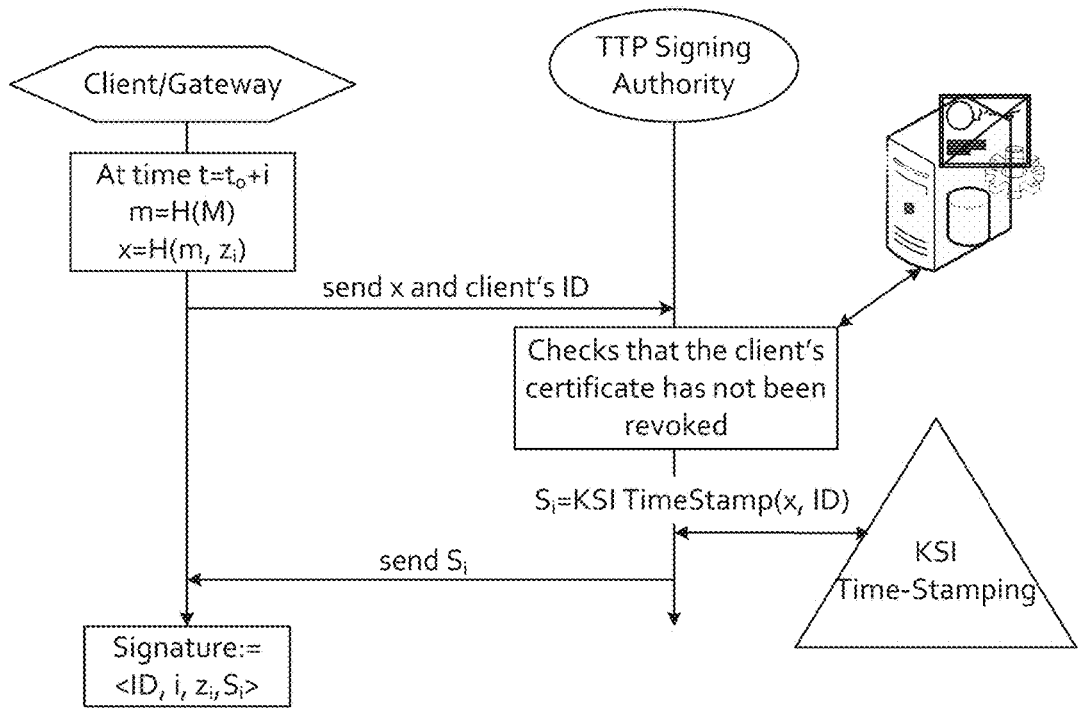
FIG. 6 illustrates a QI-KSI signing protocol.

QI-KSI signing protocol, see e.g. paper [2], is shown in FIG. 6. If the client wants to sign a piece of data, e.g. some message M, at a certain time slot $t > t_0$, such that $t = t_0 + i$, then he takes the OTSK $z_i$ and computes $x = H(M) ; z_i)$. The value of x together with the user's ID is sent to the TTP-SA. TTP-SA checks that the client's certificate has not been revoked. Then TTP-SA pushes the hash of $x \| ID$ to KSI in order to get the time stamping. The returned blob $S_i$ contains the identifier of TTP-SA, that is its static LRS of AHP, the hash path and the calendar path. CA sends $S_i$ back to the user. After the time-stamp is returned, and the current time t becomes larger than $t_0+i$ seconds, the OTSK $z_i$ can be revealed. The signer then publishes the signature as <ID, i, $z_i$, $S_i$>.

The verifier may check that $z_i$ is actually the i:th pre-image of $z_0$, and the time stamp corresponds to $t_0+i$.

QI-KSI Improved OTSKs for Verification

Figure 7:
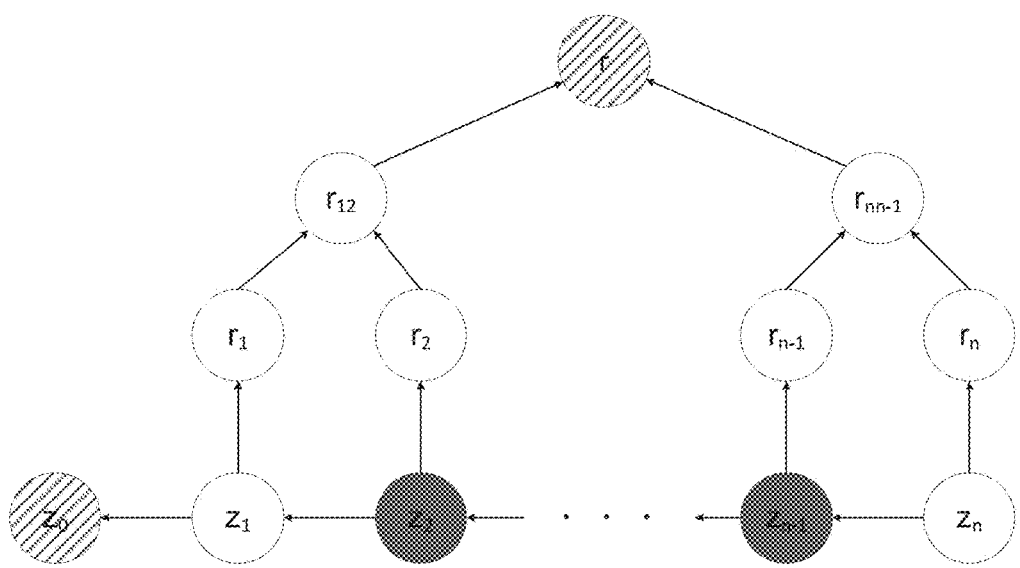
FIG. 7 illustrates an example of modified OTSKs in a QI-KSI solution.

FIG. 7 illustrates modified OTSKs in a QI-KSI solution. In the QI-KSI signing protocol, the signer may derive the OTSK $z_i$ in $\log(n)$ time with the help of $\log(n)$ intermediate hash values using the hash sequence reversal technique, as it was described earlier.

The problem comes for the verifier who wants to check the signature, as he only knows $z_i$ but needs to verify it against the public key $z_0$. The verifier does not have those intermediate hash values and thus has to perform i hashes starting from $z_i$ and going all the way to $z_0$.

In order to reduce the time and/or complexity of the verification process, the following modification to OTSKs was proposed. This includes building yet another modified Merkle tree on top of OTSKs as shown in FIG. 7.

The client's certificate additionally includes the root hash r, and the signature additionally includes the hash path from the OTSK $z_i$ to the root r. Thus, the verifier only needs to check that $z_i$ participated in the hash root generation, and the L-R sequence of the hash path is translated to the correct index i.

For efficiency reasons, the signer needs to keep the relevant part of the hash-tree, and in the signing process the part of the hash tree that leads to the root hash r may be partly recomputed in $\log(n)$ time with $\log(n)$ intermediate hash values. That computation also requires the knowledge of other values $z_i$ in an efficient way, but then this part may be done with a hash chain traversal technique as demonstrated in U.S. provisional patent application No. 62/118, 808.

Synchronization with KSI

It is important that $S_i$ returned by TTP-SA corresponds to the OTSK $z_i$ that has been used by the client. QI-KSI proposes the idea that the client actually needs to use 3 (or more) keys $z_i$, $z_{i+1}$ and $z_{i+2}$ and send a parallel request to TTP-SA for time-stamping. The signer will get 3 time stamps S's, but the stamp's time will correspond to only one of $z_i \ldots z_{i+2}$.

All this also means that the signer can produce one signature per 3 time slots, i.e., one signature per 3 seconds. However, as will be demonstrated below under the headline 'Further Options', efficiency may be improved also in this sense.

The gist of this disclosure will now be presented, followed by some optional features, and thereafter further disclosure about methods and their implementations. It is readily understood from this disclosure that any combination with the demonstrated features of the KSI concept are applicable.

Time Fraction Sub-Trees in Hash Based Time Stamping Services for a Faster Streaming of Requests of Services Consider that KSI RH (root hash) is computed for each interval. Further, assume the intervals to be 1 second (but of course other interval settings are possible). As it was also mentioned in the section discussing synchronization with KSI above, the synchronization that is proposed in QI-KSI makes it possible to the client to make 1 signing per 3 seconds (3 KSI's time slots). However, in a use case when the client needs to sign a stream of data, this might be a performance bottleneck.

The solution demonstrated above has mainly been discussed in view of a general case where an external service (KSI's time stamping, TTP SA service, other external modules that can, but not necessarily, be hash-based) is available once per a time slot (like in KSI, the service is available once per second). However, in the solution demonstrated below, the technique is demonstrated based on the example of the QI-KSI signing scheme for the sake of easier understanding for the reader.

By extending the global KSI tree with a time fraction Merkle sub-tree on the TTP-SA node it is possible for one or more clients/gateways to perform signing for a stream of data items with the average speed faster than the speed of producing time stamps with KSI, i.e. faster than demonstrated with reference to the disclosure of sending sequence of signing requests to TTP-SA using OTSKs with time-forwarded OTSKs indexes above. It is to be noted that the approach demonstrated below may be combined with time-forwarded OTSKs indexes as demonstrated above for efficient provision of OTSK keys, e.g. for performing signatures for a stream of data.

The approach makes it possible for the client to have only one hash chain of OTSKs, where each one-time signing key corresponds to its own fraction of a second. That sub-tree will serve as a KSI's time slot splitter of a time slot into smaller time fractions.

Figure 9:
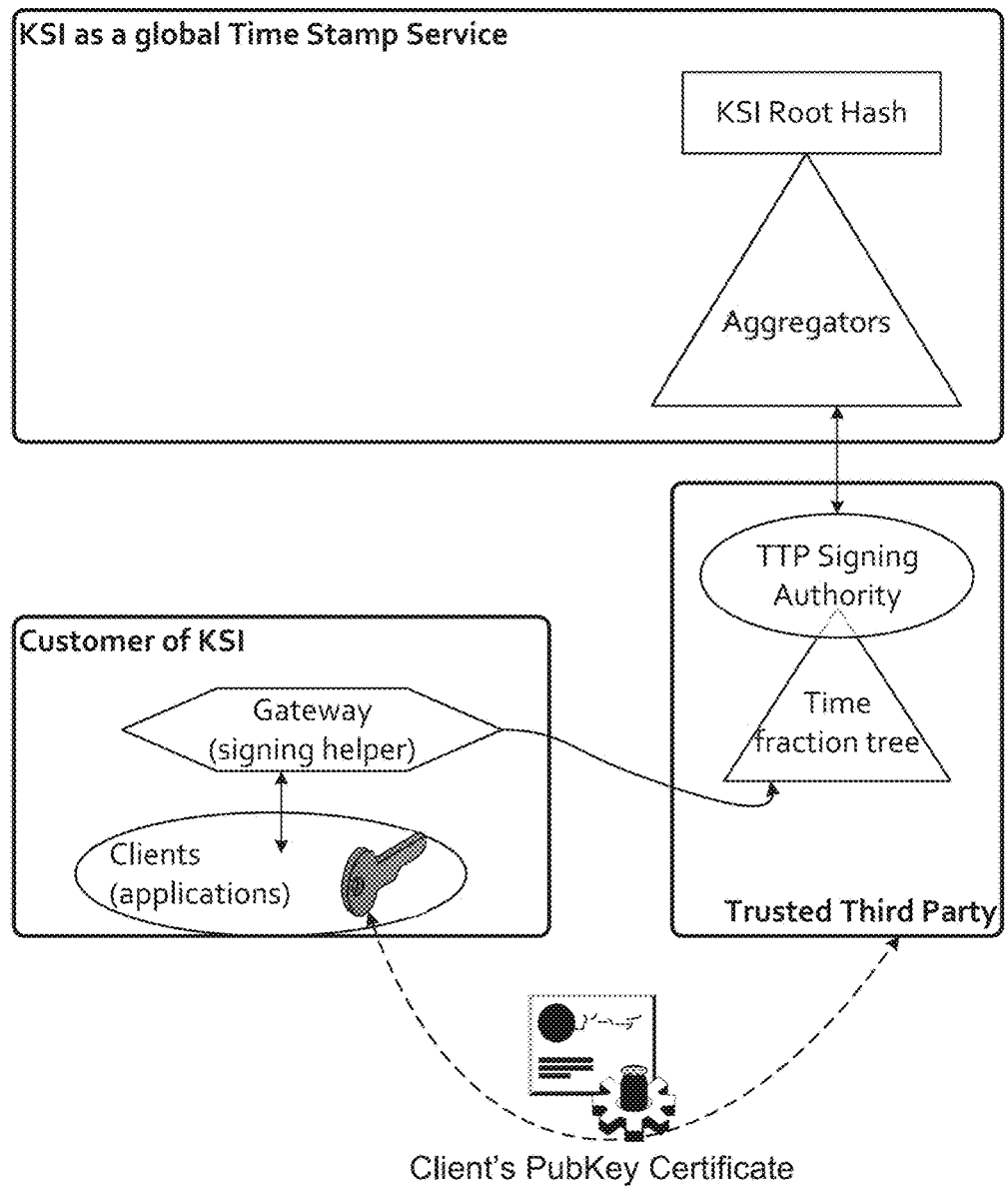
FIG. 9 illustrates a modified TTP-SA.

FIG. 9 illustrates a modified TTP-SA. We propose that the TTP-SA is arranged to use a yet another Merkle sub-tree with K leafs. The purpose is to split the KSI's 1 second time slot into K fractions of the second. Each leaf of the sub-tree corresponds to the certain fraction of the second, and thus the TTP-SA may accept multiple signing requests from one or multiple clients/gateways simultaneously, providing time-stamps with a better time-granularity than just 1 second.

Figure 10:
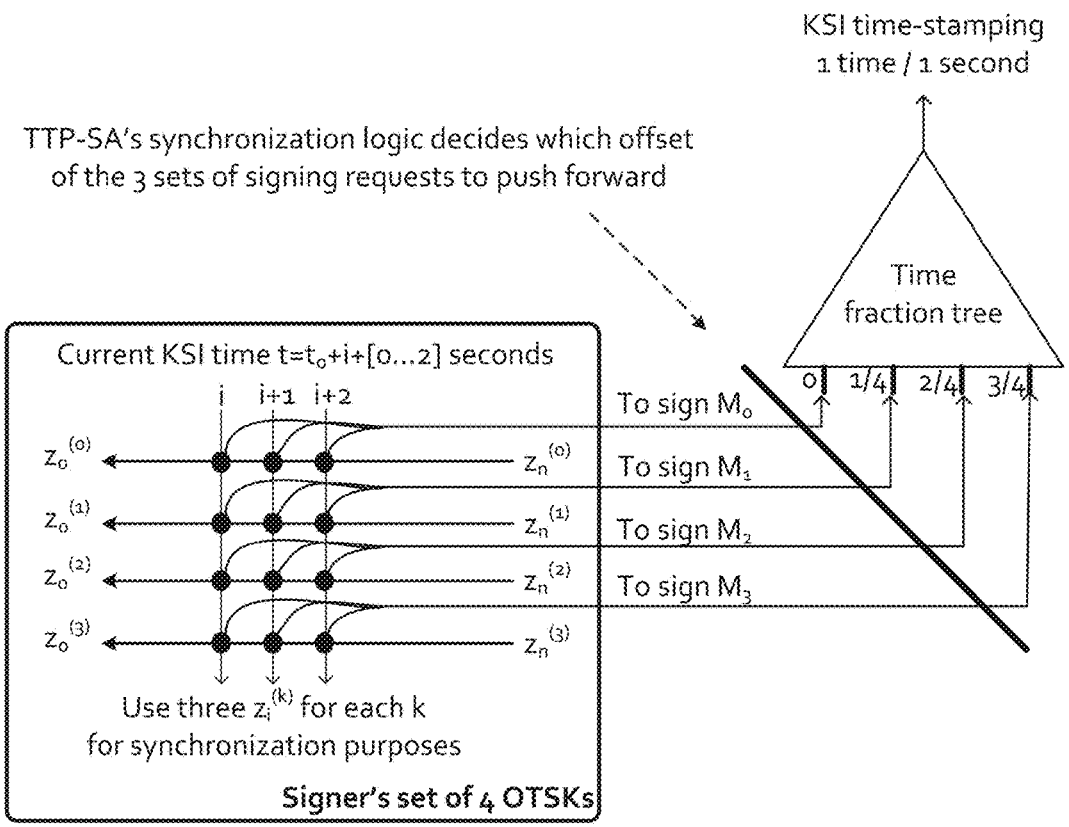
FIG. 10 illustrates an example when a time slot is split into fractions.

OTSKs of clients thus may be modified in such a way that now the client may create K sets of OTSKs. One set corresponds to and is used within one certain fraction of a second. FIG. 10 illustrates an example when a time slot is split into K fractions, where K=4 in the example.

For example, if the TTP-SA's time-splitting sub-tree has 4 leafs, then TTP-SA is capable to perform 4 signatures per second, instead of 1 as of the original QI-KSI. The client generates 4 hash chains from 4 secret keys $z_n^{(0)} \ldots z_n^{(3)}$ and uses the OTSKs produced by $z_n^{(k)}$ in the signing times $t=t_0+i+k/4$ seconds, for $i=1 \ldots n$, $k=0 \ldots 3$ (for the example of K=4; K may be selected arbitrarily to achieve desired granularity).

For each fraction of a second the TTP-SA returns, as the result of signing request, the same $S_i$, but adds the hash path of the TTP-SA's time fraction sub-tree that is also included by the signer into the final signature.

The verifier may apply:
the LRS of AHP as the identifier for TTP-SA;
the LRS of CHP to identify the time in seconds when the time-stamp was created;
the LRS of the HP of the TTP-SA's time fraction sub-tree identify the fraction of the second when the time stamp was created.

Note that AHP and CHP parts of $S_i$ will be the same for all K signing requests within the same time slot. However, the HP of the time fraction tree will be different. Also note that since TTP-SA enters K hash values to the leafs of the time-fraction tree's HP, the signer or anyone else cannot ignore that HP since then the signature becomes invalid and non-verifiable.

For synchronization purposes, the signer may still use the idea from the QI-KSI design demonstrated above, where for every fraction slot $k=0, \ldots, K-1$, the signer uses 3 consecutive OTSKs $z_i^{(k)}$, $z_{i+1}^{(k)}$, $z_{i+2}^{(k)}$. In this case, the average signing speed is 1 signature per 3/K seconds.

A device, application or session of a client may thus be arranged to sign for a stream of data items by a time fraction tree splitting a time slot of a time stamping infrastructure into time fractions.

A server operating a signing authority function may be arranged to receive multiple signing requests of a time slot of a time stamping infrastructure by a time fraction tree splitting the time slot of the time stamping infrastructure into time fractions.

Figure 11:
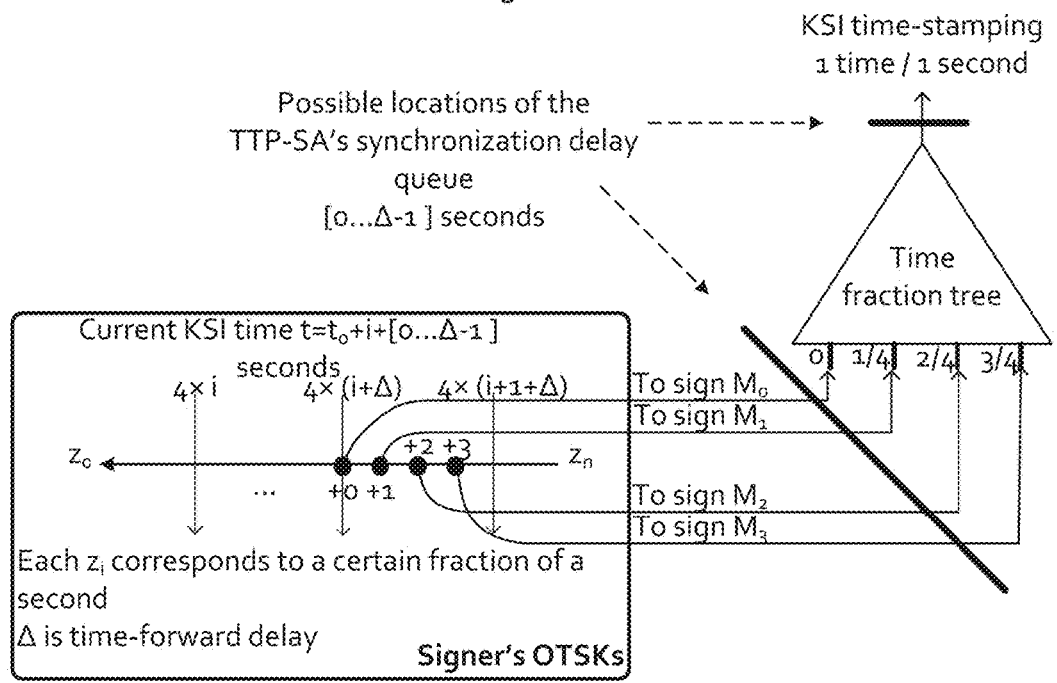
FIG. 11 illustrates an example with a fraction tree combined with delayed requests.

The approach of the fraction tree may be combined with the approach of delayed requests, which will be further demonstrated below. FIG. 11 illustrates an example thereof. Assume that the TTP-SA has a time fraction sub-tree for splitting 1 second into K fractions. The signer may create only one OTSK hash chain, but now $z_k$ corresponds to the time $(t_0+\lfloor k/K \rfloor)^{th}$ second and (k modulo K)$^{th}$ fraction of the second. The client sends a stream of signing requests using the time "current time of the signer" and the delay, $t_{sig}+\Delta$, where $\Delta$ is the maximum resynchronization time (for example, $\Delta$ may be 3.25 seconds) between the client's and the KSI's clocks, including possible delays in communication and the processing time of the TTP-SA. I.e., the client sends the requests using $z_k$s for not the current time, but for the current time plus some time offset $\Delta$.

The TTP-SA server collects signing requests, verifies the client's certificate, and allocates the prepared hashes for the delayed collective time-stamping (with KSI) into a sorted (by time) queue. TTP-SA will push the top of the time fraction sub-tree to KSI infrastructure for time-stamping at a proper time. The hash root of the fraction tree can also be prepared by TTP-SA during the given delay $\Delta$. Thus, the queue of TTP-SA may be just a queue of hash values waiting for their turns to be time stamped.

This way, TTP-SA has some time delay during which it can check the request itself (and the certificate), prepare the time fraction sub tree, calculate the root hash of that sub tree, and wait for the correct KSI's time to occur, in order to push the pre-computed hash into KSI for time stamping.

Another solution could be that the possibility for a signer to add a signing request at a fraction of a KSI's time slot t closes shortly before the time t, such that TTP-SA would still have enough time to prepare the root hash of the time fraction tree before its root hash is to be pushed for KSI time-stamping at time t.

The server returns $S_i$s together with the hash paths of its own sub-tree when the signing job for the group of requests is done, and continues to proceed with the next group of signing requests, taken from the local queue, checked and prepared in advance for the next second of the KSI's time slot.

Thus, the client can publish the received stream of signatures with the time delay $\Delta$, and the average speed 1 signature per 1/K second utilizing OTSKs efficiently.

A time stamp service provider applying a hash tree signing system of a hash-tree time-stamping part and a trusted signing authority (TTP-SA) may operate on given intervals for the TTP-SA, and there may be provided a time fraction sub-tree for splitting each interval into K fractions. The signer may create only one OTSK hash chain, where $z_k$ corresponds to the time $(t_0+(k \text{ div } K))^{th}$ time interval, e.g. second, and (k mod K)$^{th}$ fraction of the interval.

A device, application or session of a client may thus be arranged to sign for a stream of data items by a time fraction tree splitting a time slot of a time stamping infrastructure into time fractions, and be arranged to transmit signing requests to a signing authority with time-forwarded OTSKs indexes.

A server operating a signing authority function may be arranged to receive multiple signing requests of a time slot of a time stamping infrastructure by a time fraction tree splitting the time slot of the time stamping infrastructure into time fractions, wherein the signing requests comprises time-forwarded OTSKs indexes, and the server is arranged to store them in a queue, and when the KSI time becomes aligned with the time of a request in the queue to push the corresponding hash value to a KSI infrastructure and receive the right time stamping. Any calculations may be pre-calculated for the requests of the queue.

A server operating a signing authority function may be arranged to receive signing requests to a signing authority with time-forwarded OTSKs indexes, store them in a queue, and when the KSI time becomes aligned with the time of a request in the queue to push the corresponding hash value to a KSI infrastructure and receive the right time stamping. Any calculations may be pre-calculated for the requests of the queue.

The generation of further OTSKs, as of the optional approach demonstrated above, may benefits from deriving OTSKs directly by a one-way function, which will be further demonstrated below.

Further Options

The approach of deriving the OTSKs directly by a one-way function has been shown above to provide an efficient way to provide the OTSK and thus hash value for a piece of data for use in the KSI context as previously known. Below, the applicability for further developments of the KSI approach and novel features thereof will be demonstrated.

Deriving the OTSKs Directly via a One-Way Function

Figure 8:
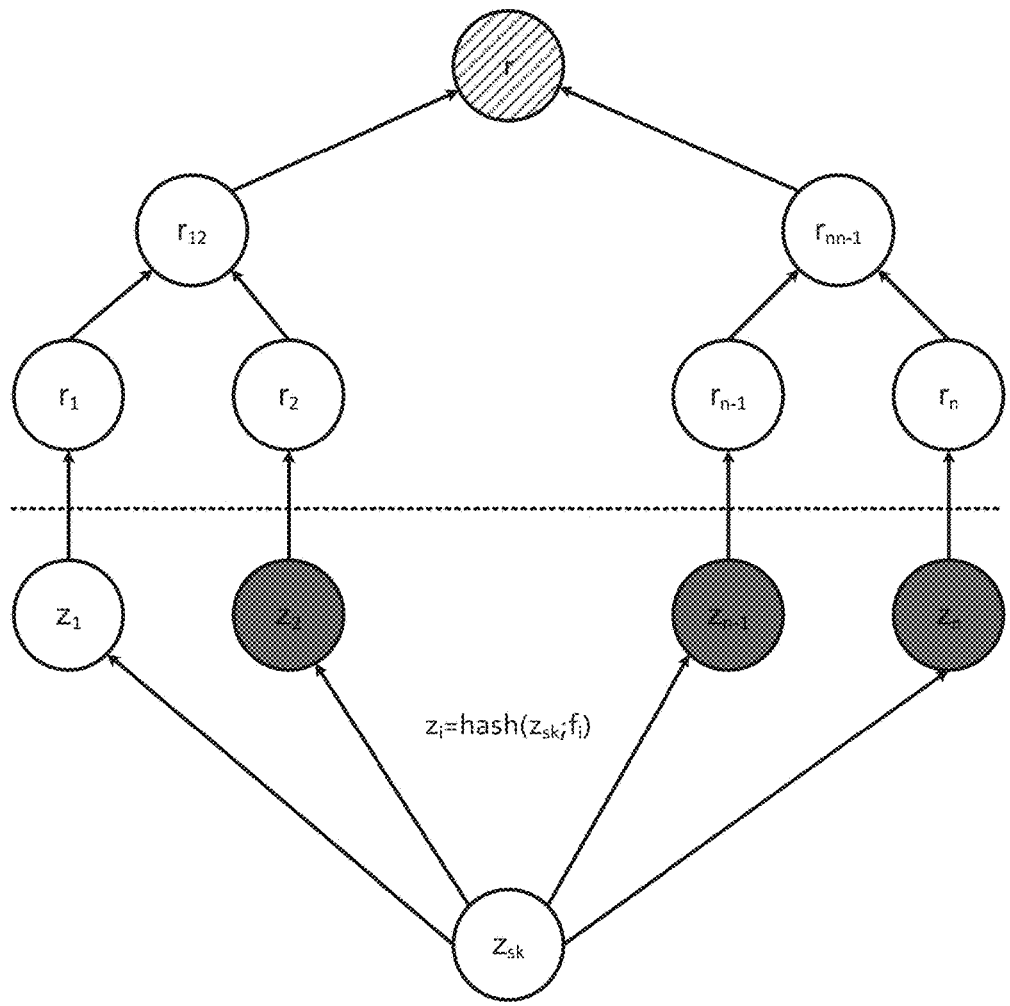
FIG. 8 illustrates an alternative example of modified OTSKs in a QI-KSI solution.

FIG. 8 schematically illustrates an approach for deriving the OTSKs directly via a one-way function. It may be a desire to improve the part of deriving the one time signing keys, OTSK's, values $z_i$ of the signer's OTSK hash chain. The derivation of $z_i$:s traditionally requires, even with the M. Jakobsson and D. Coppersmith technique of [6], the signer to spend additionally log(n) time for each $z_i$, and to store additionally log(n) intermediate hash values. However, as described below, this can be done in O(1) time without storing intermediate hash values.

We propose that instead of the hash chain $z_0 \leftarrow \ldots \leftarrow z_n$, as discussed above, where $z_n$ is the secret key and $z_0$ is the public key, the signer derives any of the OTSKs directly via a one-way function, given that all $z_i$s are bound by the root of a Merkle tree on top of the OTSKs sequence $\{z_i\}$.

Instead of the hash chain $z_0 \leftarrow \ldots \leftarrow z_n$, the signer may derive any of the OTSKs as follows:

$z_i = H(z_{sk}; f_i)$, for $i=1, \ldots, n$, where $H$ is a one-way function, where $z_{sk}$ is a secret key of the signer, and $f_i$ is a function on the index i that generates different values for each $i = 1, \ldots, n$. For example, this function can be as simple as $f_i = i$, but it may be a more complex one. As an alternative, the $z_i$:s may be generated as $z_i = HMAC(z_{sk}; f_i)$. The new scheme is shown in FIG. 8, where the upper part, i.e. above the dotted line, shows the verification of the OTSK values which is performed in the same way as demonstrated above, e.g. with reference to FIG. 7. The difference in this approach is thus the way the OTSK values are derived, i.e. by the one-way function.

The signer's certificate then does not need to have $z_0$, but it may comprise: the user's identity records, the root hash value r that combines all OTSKs, the value n that indicates the expiration time for the secret key $z_{sk}$ as well as determines the height of the tree, and the validation time $t_0$, after which the certificate is valid. Since the LRS of the hash path encodes the index of $z_i$ uniquely, then this is the way to verify that $z_i$ is actually the OTSK that corresponds to the time $t_0 + i$.

The root hash thus still can prove that the hash path of OTSK $z_i$ was originated from the same secret source. The LRS of the hash path from $z_i$ to r determines the time slot when the OTSK $z_i$ can be used and be verified against the returned time-stamp.

The use of $z_{sk}$ makes it faster and/or requires less processing/memory resources for the signer to derive the values $z_i$ for any i at any time without having to keep O(log(n)) intermediate hash values and spend O(log(n)) of time to derive $z_i$, or calculate all hash values in the hash chain from $z_n, z_{n-1}, \ldots$, etc.

Since in this modification the certificate now includes the expiration time (that is equal to $t_0 + n$), and the TTP-SA also checks for the validity of the signer's certificate, then this scheme will be as secure as the one proposed in QI-KSI above, and it is more efficient.

After the expiration of the key usage time, the secret key $z_{sk}$ can be thrown away, whereas all created signatures remain valid in time and verifiable.

By this, the signing process is faster and/or requires less storage resources (Cf. M. Jakobsson and D. Coppersmith technique) for the intermediate state, or requires less processing resources (Cf. traditional approach without M. Jacobsson and D. Coppersmith technique).

The above mentioned approach is also applicable for deriving other OTSK values, as will be described below.

Thus, for the QI-KSI signal model, there is provided a method to process for a hash tree infrastructure at predetermined intervals presented derived values of data to obtain a root hash value referred to as time-stamps that may be published such that the presented hash values to be processed depend on previously published root hash values, and a processes to compute and deliver a signature for the data after checking by a trusted signing authority wherein the derived values are the hash or mac of the data using an one-time signing key that is computed by a message authentication function. As demonstrated above, the one-time signing key may be computed as $z_i = H(z_{sk}; f_i)$, for $i=1, \ldots, n$, where H is a one-way function, where $z_{sk}$ is a secret key of the signer, and $f_i$ is a function on the index i that generates different values for each $i=1, \ldots, n$. The function may be $f_i = i$.

One-Time Proof of Knowledge for One-Time Signing Keys in Hash Based Signing Schemes FIG. 6 shows how the signing protocol uses TTP-SA. The TTP-SA issues a time stamp of the signing request only when the client's certificate is valid. This builds the trust for the verifier that at the time when the signature was actually created, the client's certificate has not been revoked. Therefore, the verifier does not need to check the status of the client's certificate during the verification time.

A problem may be that TTP-SA does not know the content of the value x—one part of the signing request, in the way that x (the value that the client derives and sends to TTP-SA; see section "QI-KSI Signing Protocol" above) can be anything and be generated by anyone.

While issuing a signature, TTP-SA also does not know if the signing request comes from a legitimate user or from someone else. Hence, the TTP-SA may start to work and later when almost everything is ready find out that the user was not legitimate.

It may thus be desirable to have a solution where the TTP-SA could verify that it is the authorized client who sends the signing request on his name, which would build a better trust in the signature.

By using the hash path of a hash image of the actual OTSK as the proof that the user actually knows the not yet public secret OTSK, the TTP-SA may be better protected from doing work for non-legitimate requestors. The signer's signature may be shorter, and verification faster. The user sends this proof to the TTP-SA along with the signing request, so that the signing authority can verify the legitimacy of the signer before actually producing a signature fingerprint.

The way to generate OTSKs by a user and the usage of such a proof-of-knowledge is not limited by the described use case, and the approach demonstrated here may be combined with any of the other approaches demonstrated in this disclosure. However, the benefit of deriving the OTSK by a one-way function as demonstrated above is evident when used together with this approach of providing one-time proof of knowledge to a signing authority.

FIG. 7 illustrates how the hash chain is built (and FIG. 8 illustrates an alternative approach thereof) and its elements are used as OTSKs. For efficiency reasons on the verifier side, the combined root hash r of all OTSKs in the modified Merkle tree is public and included in the signer's certificate.

By including the path from $z_i$ to the root r in the signature, the verifier is enabled to (a) check in $O(\log(n))$ time that $z_i$ has been participated in the computation of the root value r and, by this way, to prove that $z_i$ is valid; and (b) the LRS of the hash path from $z_i$ to the root hash r also encodes the index i of the OTSK $z_i$ and, thus, the verifier can compare the time $t_0+i$ against the KSI's time-stamp's time slot, and that $z_i$ was used in the correct time slot.

The hash path from $r_i$'s (where $r_i=H(z_i)$) to the public root hash r is actually the one-time proof of knowledge (OTPoK) of the secret OTSK $z_i$, without revealing $z_i$.

By the client sending the OTPoK of the secret key to the TTP-SA along with the request, the TTP-SA may (additionally) verify that the OTPoK corresponds to the client's public key r that is stored in the client's certificate. The TTP-SA may add the value of $r_i$ into the time-stamping process.

Thus, in the pair $z_i \rightarrow r_i$ the value $r_i$ "authenticates" to the TTP-SA the value of the OTSK $z_i$.

As a positive side effect, the signer's signature does not need to include the hash path from $z_i \rightarrow r$, but only the OTSK $z_i$, if TTP-SA includes $r_i$ as the part of the time-stamping computation. The verifier sort of "exports" the need to check of the hash path by letting the TTP-SA verify the hash path $r_i \rightarrow r$ before issuing the time-stamp $S_i$. The connection between $z_i$ and $r_i$ (and, thus, to $r_i \rightarrow r$) can be verified later on if the TTP-SA pushes the hash of the modified vector {x; userID; $r_i$} into KSI for time-stamping.

After a key generation, the signer has the sequence of OTSKs {$z_1 \ldots z_n$}, that are valid for signing at times $t_0+i$ time slot of KSI. The root hash r of a Merkle tree with the leafs values $r_i$s, i=1, . . . , n, where $r_i=H(z_i)$ for some one-way function H, as demonstrated above. The client's certificate may include the vector: {user ID; r; $t_0$; TTP-SA's KSI identifier}

Signing of a message M at some time $t=t_0+i$, where $t_0 < t \leq t_0+n$, may then comprise the following protocol:

1. Signer computes $x=H(H(M); z_i)$ and sends to TTP-SA the vector {i; x; userID; HP $r_i \rightarrow r$}, where HP indicates hash path.

2. TTP-SA picks the right certificate that matches the pair {userID; r} and checks that it has not been revoked.

3. TTP-SA checks that HP $r_i \rightarrow r$ is correct, and that LRS of that HP is mapping to the index i.

4. TTP-SA sends the hash of {x; userID; $r_i$} to KSI in time $t=t_0+i$, and receives the time-stamping $S_i$, that is AHP (aggregate HP) and CHP (calendar HP).

5. TTP-SA sends $S_i$ back to the signer.

6. The signer reveals the signature of the message M as <userID;i;$z_i$;$S_i$>

The verification process is considered successful if:

1. $H(x=H(H(M);z_i);$ userID; $r_i=H(z_i))$ is the leaf of $S_i$;

2. LRS of $S_i$'s AHP leads to the correct TTP-SA's KSI identifier that is bound in the signer's certificate;

3. $S_i$'s AHP and CHP lead to the correct CRH for the time $t_0+i$.

Thus, the approach may include that the signing authority receives a proof-of-possession before starting to process the request in the hash tree, computation and issuing of signature. The proof of possession may comprise sending the OTPoK of the secret key to the TTP-SA along with the request. The TTP-SA may verify that OTPoK corresponds to the client's public key that is stored in the client's certificate. The TTP-SA may add the value of $r_i$ into the time-stamping process.

A device, application or session of a client may thus be arranged to transmit a proof-of-possession to a signing authority TTP-SA before the TTP-SA starts to process a request in the hash tree, compute and issue of signature. The transmission of the proof of possession may comprise sending the OTPoK of the secret key to the TTP-SA along with the request.

A server operating a signing authority function may be arranged to receive a proof-of-possession from a client, to verify whether the OTPoK corresponds to the client's public key that is stored in the client's certificate, and omit computation and issuing of a signature when the OTPoK does not correspond to the client's public key and compute and issue signature when the OTPoK corresponds to the client's public key. The TTP-SA may add the value of $r_i$ into the time-stamping process.

Sending Sequence of Signing Requests to TTP-SA using OTSKs with Time-Forwarded OTSKs Indexes This part of the disclosure relates to Time Fraction Sub-Trees in Hash Based Time Stamping Services for Faster Streaming of Requests of Services. Consider that KSI RH (root hash) is computed for each interval. Further, assume the intervals to be 1 second (but of course other interval settings are possible).

An issue may be how QI-KSI, as demonstrated above, proposes to synchronize the OTSK $z_i$ with the KSI's tune. In the QI-KSI solution demonstrated above, when the signer sends a signing request to the TTP-SA, the client may take a group of OTSKs, for example three consecutive signing keys $z_i$, $z_{i+1}$ and $z_{i+2}$, and send 3 signing requests to the TTP-SA simultaneously. The TTP-SA then can choose one out of the given three whose i corresponds to the current KSI's time, and push it to the KSI for time-stamping in the proper time slot. Since the client may reveal OTSK $z_{i+2}$ only at time $t > t_0+i+2$, this means that the client can produce a stream of signatures with the speed of 1 signature per 3 KSI's time slots (that is 1 signature per 3 seconds, with the above discussed design of the KSI's Core Network).

For the use case where the client needs to sign a stream of data messages, the QI-KSI's way to synchronize the time between the signer and KSI is not optimal. It is a desire to provide a better synchronization solution so that the client does not waste OTSK keys and can perform signatures for a stream of data, e.g. with the speed in average of 1 signing per KSI's time slot (a second).

Consider that the signer is enabled to send the sequence of signing requests to the TTP-SA using OTSKs with time-forwarded OTSKs indexes, and by this the client proposes the delay time before the actual time-stamping procedure, so that there is enough time for TTP-SA to receive the requests, prepare them and synchronize the time with KSI. In the use case where one needs to produce a stream of signatures, this synchronization scheme, as will be demonstrated in further detail below, utilizes the KSI resources particular, KSI's time slots) efficiently, which makes the signing speed to converge to 1 signature per one KSI time slot, in average.

Assume that the possible resynchronization time between the signer's and KSI's clocks can be at most $\Delta$ seconds (for instance, let $\Delta$ be 5 seconds), including possible delays in communication between the signer and the TTP-SA. When the signer sends a signing request at his local time $t_{sig}$, he actually may use the time-forwarded OTSK with the index $t_{sig} - t_{0+} \Delta$, prepare and send a signing request to the TTP-SA.

The TTP-SA may have a local queue with incoming signing requests that are already checked for the client's certificate and are waiting for being entered to KSI at the right tune for time-stamping. When the KSI time becomes aligned with the time of the first request in the queue, i.e., when the KSI's time becomes $t_{sig} + \Delta - 1$, the TTP-SA pushes the corresponding hash value to the KSI infrastructure and receives the right time stamping.

Thus, the client reveals the stream of signatures with the delay of $\Delta$ seconds. In the use case of a stream of signatures, the performance may then converge to the speed 1 signature per KSI time slot.

Note that in the above the clocking is described as being 1 second. However it is readily understood that it is equally applicable to other clocking interval settings.

A trusted signing authority applying a hash tree signing system may have a local queue that comprises signing requests that use a time-forward OTSK that are already verified and which start further processing when the time with the hash tree system gets aligned. The OTSK may be determined by having the index $t_{sig} - t_0 + \Delta$.

The sending of the sequence of signing requests to TTP-SA using OTSKs with time-forwarded OTSKs indexes benefits from being combined with the approach for deriving the OTSKs directly via a one-way function, and may also benefit from the approach for one-time proof of knowledge for one-time signing keys in hash based signing schemes, as well as with an approach comprising a combination of them.

A device, application or session of a client may thus be arranged to transmit signing requests to a signing authority with time-forwarded OTSKs indexes.

A server operating a signing authority function may be arranged to receive signing requests with time-forwarded OTSKs indexes, store them in a queue, and when the KSI time becomes aligned with the time of a request in the queue to push the corresponding hash value to a KSI infrastructure and receive the right time stamping. Any calculations may be pre-calculated for the requests of the queue.

Methods and Implementations

Figure 12:
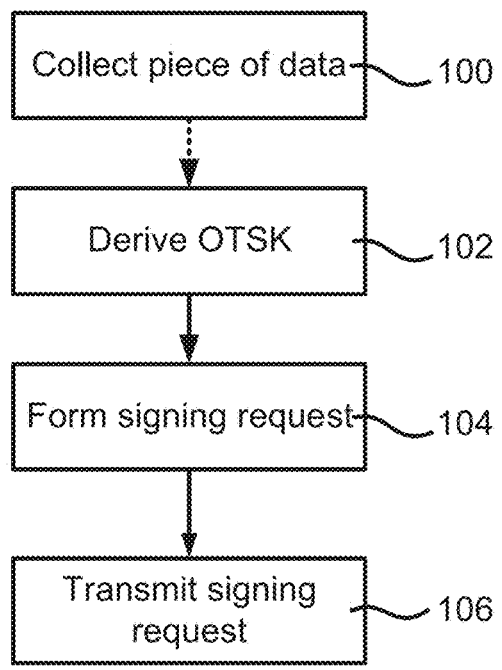
FIG. 12 is a flow chart illustrating a method of a client according to an embodiment.

FIG. 12 is a flow chart illustrating methods of a client, e.g. an electronic device, according to embodiments. Variants, details and explanations have already been provided above, and the flow chart should be considered as a rough, schematic and simplified illustration of the approach and some of its options.

The method of the client is for providing a hash value for a piece of data, where the hash value provides for a time-stamp for the piece of data upon verification. The method comprises collecting 100 the piece of data and deriving 102 a one-time signing key, OTSK, of a OTSK hash chain by applying a time fraction hash tree splitting a time slot corresponding to an index into time fractions such that the time slot is divided into fractions according to the number of leafs of the time fraction hash tree. A signing request for the piece of data is formed 104 by applying the OTSK for the fraction for the respective piece of data to calculate hash values of the piece of data. The signing request comprising the hash values is transmitted 106 to a server for deriving a time stamp for the piece of data.

The one or more OTSKs may be derived 102 by a one-way function. The respective OTSK is used to provide a hash value using a hash function including the OTSK and the piece of data which is intended for time signing. One or more of the following options may be included in the method: registering the hash value such that the piece of data at least later on may be verified regarding its presence at a time corresponding to an index of the OTSK used for providing the hash value, providing a one-time proof of knowledge, OTPoK, to a signing authority that the OTSK was in possession of the signer at a certain time without revealing the OTSK, and sending a signing request to the signing authority using OTSKs with time-forwarded OTSK indexes such that signing of the hashes of the pieces of data may be queued at the signing authority and the slots corresponding to OTSK indexes can be efficiently used. Further options and variants have been demonstrated above.

Figure 13:
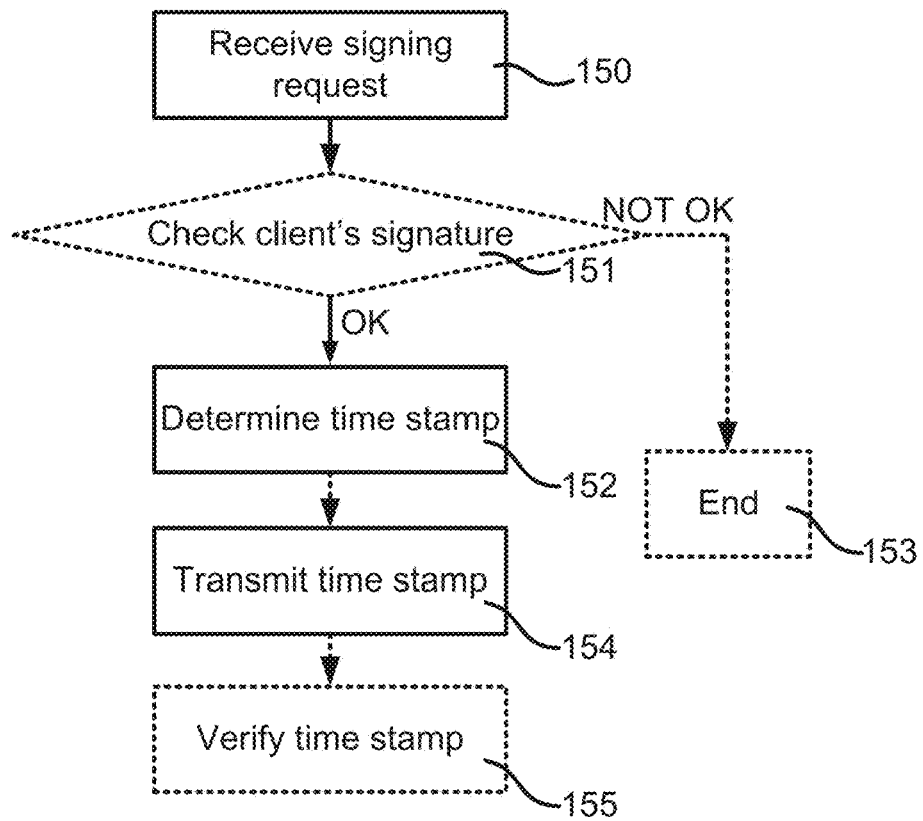
FIG. 13 is a flow chart illustrating a method of a server according to an embodiment.

FIG. 13 is a flow chart illustrating methods of a server, e.g. of a signing authority, according to embodiments. Variants, details and explanations have already been provided above, and the flow chart should be considered as a rough, schematic and simplified illustration of the approach and some of its options.

The method of the server is for issuing a time stamp signature. The method comprises receiving 150 a signing request for a piece of data formed by application of a one-time signing key, OTSK, for a fraction corresponding to an index for time fractions defined by a time fraction hash tree splitting a time slot for the respective piece of data to calculate hash values of the piece of data where the time slot is divided into fractions according to the number of leafs of the time fraction hash tree. A time stamp is derived 152 for the piece of data including a hash path of the time fraction hash tree as a sub-tree of hash tree of the OTSK, and the time stamp for the piece of data is transmitted 154, e.g. to the client. The signing request may be checked 151 for client's signature before the deriving of a time stamp. The checking of the signing request may include determining whether the client has provided a one-time proof of knowledge about a one-time signing key to a server without revealing the one-time signing key. The determining whether the client has provided a one-time proof of knowledge about the one-time signing key may comprise checking whether the hash corresponds to a one-time signing key for a root hash included in a public certificate associated with the identity, checking whether an index corresponding to the hash path from the one-time signing key to the root hash corresponds to a correct time slot, and determining it to be proven that the electronic device is in possession of the correct one-time signing key when the checks are fulfilled. Alternatively or additionally, the checking of the signing request may comprise accessing a certificate matching the identity and a root hash for the first hash, checking validity of the certificate, and verifying whether the hash path for the first hash is correct. If the certificate is not valid or the hash path cannot be verified to be correct, the server omits 153 further actions for that signing request.

The method may include verification 155 of a time stamp for a piece of data by determining whether a hash of the message is a leaf of the time stamp hash tree, determining whether the aggregate hash path corresponds to the correct identifier of the server to the server of the signature infrastructure entity, and determining whether the aggregate hash path and calendar hash path correspond to a correct calendar root hash for a time corresponding to the index.

A device, application or session of a client may thus be arranged to derive a one-time signing key $z_i$ as $z_i=H(z_{sk};f_i)$, for i=1, . . . , n, where H is a one-way function, where $z_{sk}$ is a secret key of the signer, and $f_i$ is a function on the index i that generates different values for each i=1, . . . , n. The function may be $f_i=i$.

Figure 14:
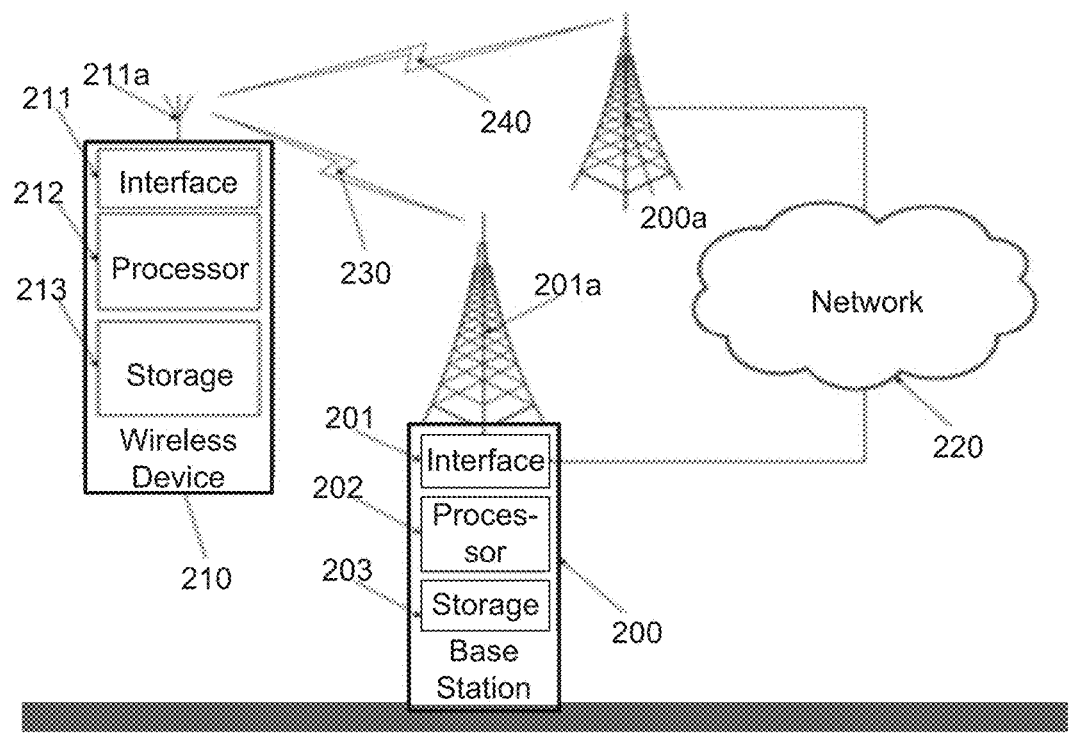
FIG. 14 schematically illustrates a wireless network with network nodes and a wireless device in which the invention may be implemented according to an embodiment.

FIG. 14 illustrates a wireless network comprising a more detailed view of network node 200 and wireless device (WD) 210, in accordance with a particular embodiment. For simplicity, FIG. 14 only depicts network 220, network nodes 200 and 200a, and WD 210. Network node 200 comprises processor 202, storage 203, interface 201, and antenna 201a. Similarly, WD 210 comprises processor 212, storage 213, interface 211 and antenna 211a. These components may work together in order to provide network node and/or wireless device functionality, such as providing wireless connections in a wireless network and allowing for a change in estimated DL CC. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

Network 220 may comprise one or more of IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 200 comprises processor 202, storage 203, interface 201, and antenna 201a. These components are depicted as single boxes located within a single larger box. In practice however, a network node may comprises multiple different physical components that make up a single illustrated component (e.g., interface 201 may comprise terminals for coupling wires for a wired connection and a radio transceiver for a wireless connection). Similarly, network node 200 may be composed of multiple physically separate components e.g., a NodeB component and a RNC component, a BTS component and a BSC component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna 201a may be shared by the RATs).

Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to a wireless devices, such as WD 210, including any of the features or benefits disclosed herein.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, utilized by network node 200. Storage 203 may be used to store any calculations made by processor 202 and/or any data received via interface 201.

Network node 200 also comprises interface 201 which may be used in the wired or wireless communication of signaling and/or data between network node 200, network 220, and/or WD 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201a. The radio may receive digital data that is to be sent out to other network nodes or WDs via a wireless connection. The radio may convert the digital data into a radio signal having the appropriate channel and bandwidth parameters. The radio signal may then be transmitted via antenna 201a to the appropriate recipient (e.g., WD 210).

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

WD 210 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 200 and/or other WDs. WD 10 comprises processor 212, storage 213, interface 211, and antenna 211a. Like network node 200, the components of WD 210 are depicted as single boxes located within a single larger box, however in practice a wireless device may comprises multiple different physical components that make up a single illustrated component (e.g., storage 213 may comprise multiple discrete microchips, each microchip representing a portion of the total storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 210 components, such as storage 213, WD 210 functionality. Such functionality may include providing various wireless features discussed herein, including any of the features or benefits disclosed herein.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by WD 210. Storage 213 may be used to store any calculations made by processor 212 and/or any data received via interface 211.

Interface 211 may be used in the wireless communication of signalling and/or data between WD 210 and network node 200. For example, interface 211 may perform any formatting, coding, or translating that may be needed to allow WD 210 to send and receive data from network node 200 over a wireless connection. Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used.

In some embodiments, the components described above may be used to implement one or more functional modules used in a collision-blocking method for hash tree based time stamping. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by processors 212 and/or 202, possibly in cooperation with storage 213 and/or 203. Processors 212 and/or 202 and storage 213 and/or 203 may thus be arranged to allow processors 212 and/or 202 to fetch instructions from storage 213 and/or 203 and execute the fetched instructions to allow the respective functional module to perform any features or functions disclosed herein. The modules may further be configured to perform other functions or steps not explicitly described herein but which would be within the knowledge of a person skilled in the art.

Figure 15:
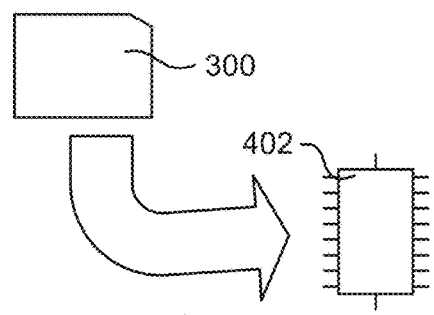
FIG. 15 schematically illustrates a computer-readable medium and a processing device.

The methods according to the present invention is suitable for implementation with aid of processing means, such as computers and/or processors, especially for the case where the processing element 202, 212 demonstrated above comprises a processor handling security functions. Therefore, there is provided computer programs, comprising instructions arranged to cause the processing means, processor, or computer to perform the steps of any of the methods according to any of the embodiments described above and those roughly summarized with reference to FIG. 12 or 13. The computer programs preferably comprises program code which is stored on a computer readable medium 300, as illustrated in FIG. 15, which can be loaded and executed by a processing means, processor, or computer 302 to cause it to perform the methods, respectively, according to embodiments of the present invention, preferably as any of the embodiments described with reference to FIG. 12 or 13. The computer 302 and computer program product 300 can be arranged to execute the program code sequentially where actions of the any of the methods are performed stepwise. The processing means, processor, or computer 302 is preferably what normally is referred to as an embedded system. Thus, the depicted computer readable medium 300 and computer 302 in FIG. 15 should be construed to be for illustrative purposes only to provide understanding of the principle, and not to be construed as any direct illustration of the elements.

The invention claimed is:

1. A method of a client for providing a plurality of hash values for a plurality of pieces of data, where each of the hash values is a basis for deriving a time stamp for a respective one of the pieces of data upon verification, the method comprising:
   operating the client in an upper layer timestamping system that dictates a size of a global time slot that corresponds to an index;
   deriving a plurality of one-time signing keys (OTSKs) of a OTSK hash chain, wherein the number of OTSKs is equal to a number of leafs of a time fraction hash tree located at a server, wherein the time fraction hash tree provides a basis for splitting the global time slot into time fractions such that the global time slot is divided into a number of fractions according to the number of leafs of the time fraction hash tree;
   forming a plurality of hash values by, for each respective one of the plurality of pieces of data, associating each of the pieces of data with a respective one of the fractions of the global time slot, and applying a respective one of the OTSKs for the fraction for the respective piece of data to calculate a hash value of the respective piece of data; and
   transmitting the plurality of hash values to the server for deriving a time stamp to be used when creating signatures for all fractions of the global time slot,
   wherein:
   each respective one of the OTSKs comprises a respective value of a hash chain that comprises a plurality of values bound by a root of a hash tree on top of a sequence formed by the plurality of OTSKs.

2. The method of claim 1, wherein the time fraction hash tree is splitting a global time slot corresponding to an index into K time fractions such that the client creates K sets of OTSKs.

3. The method of claim 1, comprising sending a signing request to a signing authority for a plurality of pieces of data, wherein each piece of data is assigned a respective index consecutively by using OTSKs with time-forwarded OTSK indexes.

4. The method of claim 3, wherein for the pieces of data obtaining a time stamp for each piece of data, the method comprising:
collecting the pieces of data and deriving OTSKs of a OTSK hash chain, wherein
the forming of signing requests comprises forming a stream of signing requests for the pieces of data by applying the OTSKs with time-forwarded indexes and fractions for the respective piece of data to calculate hash values of the respective pieces of data, and
the forming of signing requests comprises transmitting the stream of signing requests comprising the hash values to a server for deriving time stamps for the pieces of data, respectively.

5. The method of claim 1, comprising:
deriving OTSKs of signer's OTSK hash chain by a one-way function of a secret key of the signer and a function of an index of the OTSK; and
providing the hash value for each piece of data by a hash function including the piece of data and the derived OTSK.

6. The method of claim 5, wherein the function of the index is the index itself.

7. The method of claim 5, wherein the one-way function is a cryptographic message authentication code function.

8. The method of claim 5, wherein the one-way function is a hash function.

9. The method of claim 1, comprising registering the provided hash value.

10. The method of claim 1, comprising providing a one-time proof of knowledge of the one-time signing key to a signing authority entity without revealing the one-time signing key.

11. The method of claim 10, wherein the one-time proof of knowledge includes a hash path for the hash value, and the providing of the one-time proof of knowledge to the signing authority includes sending the index of the one-time signing key, the hash value and the hash path.

12. A method of a server of a signing authority for issuing a time stamp signature, the method comprising:
operating the server in an upper layer timestamping system that dictates a size of a global time slot that corresponds to an index;
receiving, from a client, a plurality of hash values for a corresponding plurality of pieces of data, wherein each of the hash values is formed from a respective one of the pieces of data and a respective one of a plurality of one-time signing keys (OTSKs) wherein each hash value corresponds to a respective one of a plurality of fractional time slots within the global time slot, wherein the number of OTSKs is equal to a number of leafs of a time fraction hash tree that splits the global time slot into a number of fractions according to the number of leafs of the time fraction hash tree;
forming the time fraction hash tree from the plurality of hash values;
using a root of the time fraction hash tree to obtain a first time stamp from the upper layer timestamping system, wherein the first time stamp corresponds to the global time slot;
deriving a plurality of second time stamps, one for each respective one of the received hash values, wherein each one of the second time stamps includes the first time stamp and a hash path from the respective one of the received hash values to the root of the time fraction hash tree; and
transmitting, to the client, the plurality of second time stamps,
wherein:
each respective one of the OTSKs comprises a respective value of a hash chain that comprises a plurality of values bound by a root of a hash tree on top of a sequence formed by the plurality of OTSKs.

13. The method of claim 12, wherein each of the received hash values is included in a respective one of a plurality of signing requests for the plurality of pieces of data, and wherein the plurality of signing requests are received for one global time slot, wherein the maximum number of signing requests for a time slot is the number of fractions defined by the time fraction hash tree.

14. The method of claim 12, wherein each of the received hash values is included in a respective one of a plurality of the signing requests that are checked for client's signature before the obtaining of a first time stamp.

15. The method of claim 14, wherein checking of the signing request includes determining whether the client has provided a one-time proof of knowledge about a one-time signing key to a server without revealing the one-time signing key, the determining comprising:
checking whether the hash corresponds to a one-time signing key for a root hash included in a public certificate associated with an identity associated with the client;
checking whether an index corresponding to the hash path from the one-time signing key to the root hash corresponds to a correct time slot; and
determining that the electronic device is in possession of the correct one-time signing key when the checks are fulfilled.

16. The method of claim 14, wherein the checking of the signing request comprises:
accessing a certificate matching an identity associated with the client and a root hash for a first hash received from the client;
checking validity of the certificate;
verifying whether the hash path for the first hash is correct, wherein
if the certificate is not valid or the hash path is not verified to be correct, the server omits further actions for that signing request.

17. The method of claim 12, wherein the upper layer timestamping system is a signature infrastructure, and wherein the plurality of hash values are received in a signing request that is a part of a sequence of signing requests with time-forwarded OTSKs indexes such that a delay time before performing a time stamping procedure to obtain the first time stamp from the signature infrastructure is provided so that there is enough time for receiving and preparing the signing requests and for synchronizing the time with the signature infrastructure.

18. The method of claim 12, wherein the server is a server of a Trusted Third Party Signing Authority.

19. The method of claim 12, wherein the upper layer timestamping system is a Keyless Signature Infrastructure.

20. The method of claim 12, further comprising transmitting the second time stamps to the client, wherein a signer is enabled to reveal a signature of the piece of data including an identity, an index of the one-time signing key, the OTSK and the time stamp for enabling verification of the time stamp for the piece of data.

21. The method of claim 12, wherein the plurality of hash values are received in a signing request that comprises a message from an electronic device, the message including a one-time proof of possession hash value, an identity associated with the client and a hash path of the one-time proof of possession hash value.

22. The method of claim 12, wherein the plurality of hash values are received in a signing request that comprises a message from an electronic device, and wherein the method includes verification of a time stamp for a piece of data by:
    determining whether a hash of the message is a leaf of the time stamp hash tree;
    determining whether an aggregate hash path corresponds to a correct identifier of the server to the server of the signature infrastructure entity; and
    determining whether the aggregate hash path and calendar hash path correspond to a correct calendar root hash for a time corresponding to the index.

23. The method of claim 12, wherein the plurality of hash values are received in a signing request that comprises a respective hash value of each of the pieces of data, wherein each of the hash values is formed using a time-forwarded OTSK, wherein the time-forwarded OTSK comprises a time-forwarded index, and the obtaining of the first time stamp comprises:
    queuing the signing request;
    pushing the hash value to a signature infrastructure entity at a time-forwarded time; and
    receiving the first time stamp from the signature infrastructure entity.

24. An electronic device comprising processing circuitry arranged to derive one-time signing keys and provide a plurality of hash values for a plurality of pieces of data, wherein the processing circuitry is arranged to perform a method comprising:
    operating a client in an upper layer timestamping system that dictates a size of a global time slot that corresponds to an index;
    deriving a plurality of one-time signing keys (OTSKs) of a OTSK hash chain, wherein the number of OTSKs is equal to a number of leafs of a time fraction hash tree located at a server, wherein the time fraction hash tree provides a basis for splitting the global time slot into time fractions such that the global time slot is divided into a number of fractions according to the number of leafs of the time fraction hash tree;
    forming a plurality of hash values by, for each respective one of the plurality of pieces of data, associating each of the pieces of data with a respective one of the fractions of the global time slot, and applying a respective one of the OTSKs for the fraction for the respective piece of data to calculate a hash value of the respective piece of data; and
    transmitting the plurality of hash values to the server for deriving a time stamp to be used when creating signatures for all fractions of the same global time slot,
    and
    wherein:
        each respective one of the OTSKs comprises a respective value of a hash chain that comprises a plurality of values bound by a root of a hash tree on top of a sequence formed by the plurality of OTSKs.

25. The electronic device of claim 24, wherein the electronic device is a wireless device.

26. A server comprising processing circuitry arranged to derive a time stamp, wherein the processing circuitry is arranged to perform a method comprising:
    operating the server in an upper layer timestamping system that dictates a size of a global time slot that corresponds to an index;
    receiving, from a client, a plurality of hash values for a corresponding plurality of pieces of data, wherein each of the hash values is formed from a respective one of the pieces of data and a respective one of a plurality of one-time signing keys (OTSKs) wherein each hash value corresponds to a respective one of a plurality of fractional time slots within a global time slot, wherein the number of OTSKs is equal to a number of leafs of a time fraction hash tree that splits the global time slot into a number of fractions according to the number of leafs of the time fraction hash tree;
    forming the time fraction hash tree from the plurality of hash values;
    using a root of the time fraction hash tree to obtain a first time stamp from the upper layer timestamping system, wherein the first time stamp corresponds to the global time slot;
    deriving a plurality of second time stamps, one for each respective one of the received hash values, wherein each one of the second time stamps includes the first time stamp and a hash path from the respective one of the received hash values to the root of the time fraction hash tree; and
    transmitting, to the client, the plurality of second time stamps for the pieces of data,
    wherein:
        each respective one of the OTSKs comprises a respective value of a hash chain that comprises a plurality of values bound by a root of a hash tree on top of a sequence formed by the plurality of OTSKs.

27. The server of claim 26, wherein the server is comprised in a network node.

28. A nontransitory computer readable storage medium comprising a computer program comprising instructions which, when executed on a processor of an electronic device, causes the electronic device to perform a method comprising:
    operating a client in an upper layer timestamping system that dictates a size of a global time slot that corresponds to an index;
    deriving a plurality of one-time signing keys (OTSKs) of a OTSK hash chain, wherein the number of OTSKs is equal to a number of leafs of a time fraction hash tree located at a server, wherein the time fraction hash tree provides a basis for splitting the global time slot into time fractions such that the global time slot is divided into a number of fractions according to the number of leafs of the time fraction hash tree;
    forming a plurality of hash values by, for each respective one of the plurality of pieces of data, associating each of the pieces of data with a respective one of the fractions of the global time slot, and applying a respective one of the OTSKs for the fraction for the respective piece of data to calculate a hash value of the respective piece of data; and
    transmitting the plurality of hash values to the server for deriving a time stamp to be used when creating signatures for all fractions of the global time slot,
    wherein:
        each respective one of the OTSKs comprises a respective value of a hash chain that comprises a plurality of values bound by a root of a hash tree on top of a sequence formed by the plurality of OTSKs.

29. A nontransitory computer readable storage medium comprising a computer program comprising instructions which, when executed on a processor of a server, causes the server to perform a method comprising:
    operating the server in an upper layer timestamping system that dictates a size of a global time slot that corresponds to an index;
    receiving, from a client, a plurality of hash values for a corresponding plurality of pieces of data, wherein each of the hash values is formed from a respective one of the pieces of data and a respective one of a plurality of one-time signing keys (OTSKs) wherein each hash value corresponds to a respective one of a plurality of fractional time slots within the global time slot, wherein the number of OTSKs is equal to a number of leafs of a time fraction hash tree that splits the global time slot into a number of fractions according to the number of leafs of the time fraction hash tree;

forming the time fraction hash tree from the plurality of hash values;

using a root of the time fraction hash tree to obtain a first time stamp from the upper layer timestamping system, wherein the first time stamp corresponds to the global time slot;

deriving a plurality of second time stamps, one for each respective one of the received hash values, wherein each one of the second time stamps includes the first time stamp and a hash path from the respective one of the received hash values to the root of the time fraction hash tree; and transmitting, to the client, the plurality of second time stamps, wherein:
  each respective one of the OTSKs comprises a respective value of a hash chain that comprises a plurality of values bound by a root of a hash tree on top of a sequence formed by the plurality of OTSKs.

* * * * *